(12) United States Patent
Bakir et al.

(10) Patent No.: US 7,099,525 B2
(45) Date of Patent: Aug. 29, 2006

(54) DUAL-MODE/FUNCTION OPTICAL AND ELECTRICAL INTERCONNECTS, METHODS OF FABRICATION THEREOF, AND METHODS OF USE THEREOF

(75) Inventors: Muhannad S. Bakir, Atlanta, GA (US); Kevin P. Martin, Atlanta, GA (US); James D. Meindl, Marietta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 10/647,703

(22) Filed: Aug. 25, 2003

(65) Prior Publication Data

US 2004/0184703 A1 Sep. 23, 2004

Related U.S. Application Data

(60) Provisional application No. 60/457,381, filed on Mar. 25, 2003, provisional application No. 60/405,934, filed on Aug. 26, 2002.

(51) Int. Cl.
*G02B 6/12* (2006.01)
*H01R 12/00* (2006.01)

(52) U.S. Cl. .................. 385/14; 385/15; 385/31; 439/66

(58) Field of Classification Search ............ 385/14, 385/15, 31, 39, 40, 146
See application file for complete search history.

(56) References Cited

U.S. PATENT DOCUMENTS

| | | | | |
|---|---|---|---|---|
| 3,681,588 A * | 8/1972 | Lee | ............... | 362/569 |
| 4,064,499 A * | 12/1977 | Geiszler et al. | ............. | 340/508 |
| 4,380,365 A | 4/1983 | Gross | ............... | 350/96.18 |
| 5,046,800 A | 9/1991 | Blyler, Jr. et al. | ......... | 385/131 |
| 5,130,356 A | 7/1992 | Feuerherd et al. | ........... | 524/96 |
| 5,294,504 A * | 3/1994 | Otagawa et al. | ........... | 429/213 |
| 5,302,656 A | 4/1994 | Kohara et al. | .............. | 524/579 |
| 5,359,208 A | 10/1994 | Katsuki et al. | ............... | 257/82 |
| 5,434,196 A | 7/1995 | Ohkawa et al. | ............. | 522/100 |
| 5,462,995 A | 10/1995 | Hosaka et al. | ........... | 525/332.1 |
| 5,581,414 A | 12/1996 | Snyder | ...................... | 359/819 |
| 5,864,642 A * | 1/1999 | Chun et al. | .................... | 385/14 |
| 5,896,479 A | 4/1999 | Vladic | ........................ | 385/59 |
| 6,022,498 A | 2/2000 | Buazza et al. | ............. | 264/1.38 |
| 6,039,897 A | 3/2000 | Lochhead et al. | ......... | 264/1.24 |
| 6,067,134 A * | 5/2000 | Akiyama et al. | ............. | 349/74 |
| 6,156,394 A | 12/2000 | Schultz Yamasaki et al. | .................... | 427/536 |
| 6,206,673 B1 | 3/2001 | Lipscomb et al. | ....... | 425/174.4 |
| 6,253,004 B1 | 6/2001 | Lee et al. | ..................... | 385/31 |
| 6,259,567 B1 | 7/2001 | Brown et al. | ............... | 359/668 |
| 6,262,414 B1 | 7/2001 | Mitsuhashi | ................ | 250/216 |

(Continued)

OTHER PUBLICATIONS

Chen, et al.; Fully Embedded Board-Level Guided-Wave Optoelectronic Interconnects; Jun. 2000; Proceedings of IEEE, vol. 88, No. 6; pp. 780-793.

(Continued)

*Primary Examiner*—John D Lee
*Assistant Examiner*—Omar Rojas
(74) *Attorney, Agent, or Firm*—Thomas, Kayden, Horstemeyer & Risley, LLP

(57) ABSTRACT

Devices and systems having one or more of the following components: a compliant pillar with a modified tip surface (non-flat tip) and a corresponding compliant socket; an optical/electrical I/O interconnect and a corresponding compliant socket; a lens/waveguide optical pillar, a polymer bridge, and an L-shaped pillar, are described herein. In addition, methods of making these components and methods of using these components are disclosed herein.

88 Claims, 8 Drawing Sheets

U.S. PATENT DOCUMENTS

| | | | |
|---|---|---|---|
| 6,272,275 B1 | 8/2001 | Cortright et al. | 385/129 |
| 6,281,508 B1 | 8/2001 | Lee et al. | 250/396 |
| 6,432,328 B1 | 8/2002 | Hamanaka et al. | 264/1.36 |
| 6,500,603 B1 | 12/2002 | Shioda | 430/321 |
| 6,771,846 B1 * | 8/2004 | Byers et al. | 385/14 |

OTHER PUBLICATIONS

Wiesmann, et al.; Singlemode Polymer Waveguides for Optical Backplanes; Dec. 5, 1996; Electronics Letters, vol. 32, No. 25; pp. 2329-2330.

Barry, et al.; Highly Efficient Coupling Between Single-Mode Fiber and Polymer Optical Waveguides; Aug. 1997; IEEE Transactions on Components, Packaging, and Manufacturing Technology—Part B, vol. 20, No. 3; pp. 225-228.

Lee, et al.; Fabrication of Polymeric Large-Core Waveguides for Optical Interconnects Using a Rubber Molding Process; Jan. 2000; IEEE Photonics Technology Letters, vol. 12, No. 1; pp. 62-64.

Schmeider, et al.; Electro-Optical Printed Circuit Board (EOPCB); 2000 Electronic Components and Technology Conference; pp. 749-753.

Mederer, et al.; 3Gb/s Data Transmission With GaAs VCSELs Over PCB Integrated Polymer Waveguides; Sep. 2001; IEEE Photonics Technology Letters, vol. 13, No. 9; pp. 1032-1034.

Schröder, et al.; Polymer Optical Interconnects for PCB: 2001; Session 13: Photonic Polymers II; pp. 337-343.

Glukh, et al.; High performance Polymeric Materials for Waveguide Applications; Aug. 2000; SPIE—The International Society for Optical Engineering, inear, Nonlinear, and Power Limiting Organics, San Diego, vol. 4106; pp. 1-11.

Liu, et al.; Plastic VCSEL Array Packaging and High Density Polymer Waveguides for Board and Backplane Optical Interconnect; 1998; Electronic Components and Technology Conference; pp. 999-1005.

Bakir, et al.; Sea of Dual Mode Polymer Pillar I/O Interconnections for Gigascale Integration; 2003; IEEE International Solid State Circuits Conference; 8 pages.

Beuret, et al.; Microfabrication of 3D Multidirectional Inclined Structure by UV lithography and Electroplating; MicroElectro Mechanical Systems, 1994, MEMS'94, Proceedings, IEEE Workshop on Jan. 25-28, 1994; pp. 81-85.

Wang, et al.; Studies on A Novel Flip-Chip Interconnect Structure-Pillar Bump; Electronic Components and Technology Conference, 2001, Proceedings, 51st, May 29-Jun. 1, 2001; pp. 945-949.

Bakir, et al.; Sea of Polymer Pillars: Dual-Mode Electrical Optical Input/Output Interconnections; in Proc. of Int. Interconnect Technology Conference; pp. 77-79; 2003.

Bakir, et al.; Sea of Polymer Pillars: Compliant Wafer-Level Electrical-Optical Chip I/O Interconnections; IEEE Photonics Technology Letters, vol. 15, No. 11, Nov. 2003; pp. 1567-1569.

Bakir, et al.; Optical Transmission of Polymer Pillars for Chip I/O Optical Interconnections; IEEE Photonics Technology Letters, vol. 16, No. 1, Jan. 2004; pp. 117-119.

Chandrasekhar, et al.; Modeling and Characterization of the Polymer Stud Grid Array (PSGA) Package: Electrical, Thermal and Thermo-Mechanical Qualification; IEEE Transactions on Electronics Packaging Manufacturing, vol. 26, No. 1, Jan. 2003; pp. 54-67.

* cited by examiner

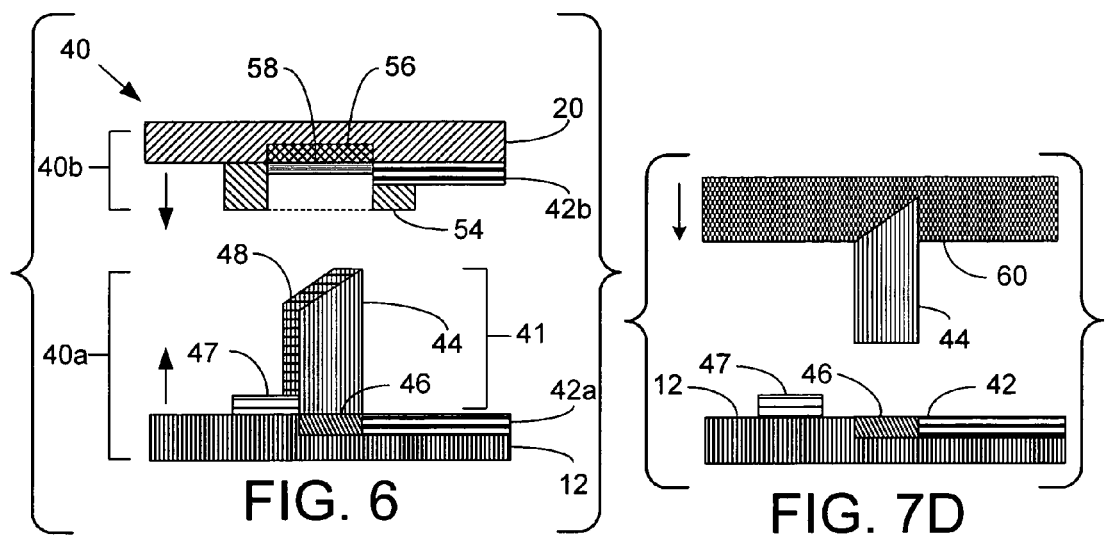
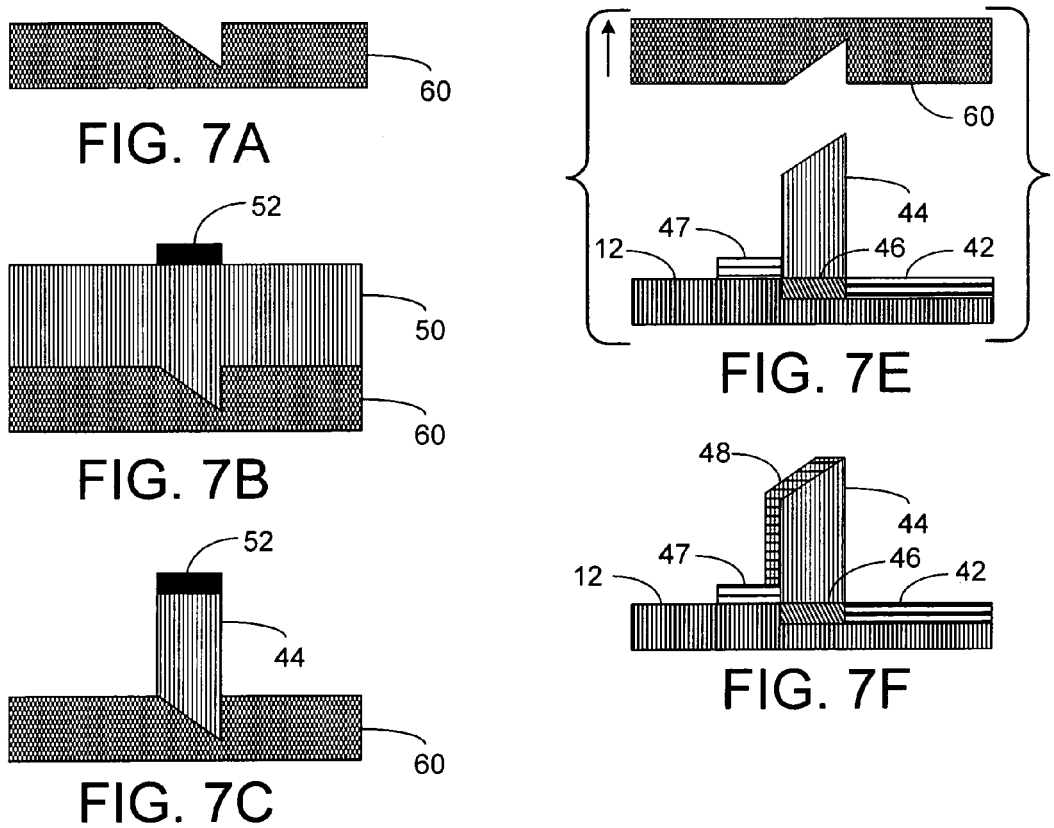

DUAL-MODE/FUNCTION OPTICAL AND ELECTRICAL INTERCONNECTS, METHODS OF FABRICATION THEREOF, AND METHODS OF USE THEREOF

CROSS-REFERENCE TO RELATED APPLICATION

This application claims priority to U.S. provisional application entitled, "COMPLIANT ELECTRICAL, OPTICAL AND RF POLYMER PILLARS AND POLYMER CONNECTORS," having Ser. No. 60/405,934, filed on Aug. 26, 2002 and U.S. provisional application entitled, "OPTICAL AND ELECTRICAL I/O INTERCONNECT FABRICATION AND CONFIGURATIONS," having Ser. No. 60/457,381, filed on Mar. 25, 2003, which are both entirely incorporated herein by reference. This application is related to co-pending U.S. nonprovisional applications entitled, "COMPLIANT WAFER-LEVEL PACKAGES WITH PILLARS AND METHODS OF FABRICATION," having Ser. No. 10/285,034, filed Oct. 31, 2002, and "DEVICES HAVING COMPLIANT WAFER-LEVEL INPUT/OUTPUT INTERCONNECTIONS AND PACKAGES USING PILLARS AND METHODS OF FABRICATION THEREOF," having Ser. No. 10/430,670, filed on May 5, 2003, which are both entirely incorporated herein by reference.

STATEMENT REGARDING FEDERALLY-SPONSORED RESEARCH OR DEVELOPMENT

The U.S. government may have a paid-up license in this invention and the right in limited circumstances to require the patent owner to license others on reasonable terms as provided for by the terms of MDA972-99-1-0002 awarded by the DARPA.

TECHNICAL FIELD

The present invention is generally related to integrated circuits, optoelectronics, photonics, waveguides, optical waveguides and, more particularly, is related to devices having non-flat pillar tips, dual-mode/function input/output interconnections, and packaging thereof, methods of fabrication thereof, and methods of use thereof.

BACKGROUND OF THE INVENTION

Conventional chip manufacturing is divided into front-end, back-end, and tail-end processing. Front-end of the line (FEOL) processing refers to the fabrication of transistors, while back-end of the line (BEOL) processing describes wafer metallization. Tail-end of the line (TEOL) processing refers to the packaging of the individual dice. Generally, the final wafer-level process step is the fabrication of vias through a passivation layer to expose the die pads, which serve as the interface between the die and the package. Each individual die, while still part of the wafer, is then functionally tested for wafer sort. The dice that pass this test are shipped to a packaging foundry where they are individually placed in a temporary package for burn-in. These dice are then individually packaged into their final package and tested again for functionality. This final step concludes tail-end processing and the functional packaged dice are ready for system assembly.

The mechanical performance of a package is important for wafer-level testing, protection, and reliability. Wafer-level testing of electrical devices requires simultaneous reliable electrical contact across a surface area. Typically, neither the wafer nor the testing substrate is planar enough to enable this reliable temporary electrical contact. In-plane (i.e., x-, y- axis) compliance is generally required to account for potential problems such as, for example, thermal expansion mismatch between the chip and printed wiring board and the probe contact leads. Wafer-level testing and burn-in demand significant out-of-plane (i.e., z-axis) compliance in order to establish reliable electrical contact between the pads on the non-planar wafer and pads/probes on the board surfaces. Non-compliance of the input/output (I/O) interconnects/pads out-of-plane, as well as in-plane (i.e., x-, y-axis), can cause difficulties in performing wafer-level testing and poor reliability. For optical interconnection, the alignment between the chip and the board should be maintained during field service to minimize optical losses due to offset.

A key interconnection level that will be severely challenged by gigascale integration (GSI) is the chip-to-module interconnection that integrates the packaged chip into the system. A gigascale system-on-a-chip (SoC) demands the development of new and cost-effective integrated input/output (I/O) interconnect solutions that use high-performance integrated electrical, optical, and radio frequency (RF) approaches to meet all of the I/O requirements of the 45 to 22 nm International Technology Roadmap for Semiconductors (ITRS) technology nodes (*International Technology Roadmap for Semiconductors* (ITRS), 2002 update, SIA). Meeting these challenges is essential for the semiconductor industry to transcend known limits on interconnects that would otherwise decelerate or halt the historical rate of progress toward GSI and beyond. In general, power, clock, and signal I/O functions will require the selective integration of fine pitch electrical (<30 μm pitch area array), optical, and RF I/O interconnect technologies. These high-density integrated I/O are needed for novel 3D structures as well as for high current (>400A) and high bandwidth (>40 Tbs) applications. To solve the above issues it is required to overcome long-range and fundamental barriers in chip-to-module interconnects by advancing fine-pitch compliant interconnections, optoelectronic and RF interconnections, and wafer-level testing and burn-in.

Accordingly, there is a need in the industry to address the aforementioned deficiencies and/or inadequacies.

SUMMARY OF THE INVENTION

Embodiments of the present invention include devices having input/output (I/O) interconnect systems. A representative I/O interconnect system includes a first substrate having at least one compliant pillar transversely extending from the first substrate. The compliant pillar includes a first material. In addition, the compliant pillar includes a non-flat tip at the end opposite the first substrate.

The present invention provides for a method of fabricating a device having at least one compliant pillar. The method includes providing a substrate, disposing a material onto at least one portion of the substrate, and removing portions of the material to form at least one pillar on the substrate.

In addition, the present invention provides for a dual-mode optical/electrical input/output (I/O) interconnect system. A representative optical/electrical I/O interconnect includes a first substrate having at least one optical/electrical I/O interconnect that includes a pillar transversely extending from the first substrate. The pillar comprises a first material, which is optically conductive. The pillar also includes a lead disposed over a portion of the pillar extending from the base of the pillar on the first substrate to the end opposite the first substrate.

The present invention also provides methods for fabricating such devices. A representative method, among others, can be summarized by the following steps: providing a first substrate having at least one optical/electrical I/O interconnect that includes a pillar transversely extending from the first substrate, wherein the pillar includes a first material, the first material is optically conductive, and the pillar includes a lead disposed over a portion of the pillar extending from the base of the pillar on the first substrate to the end opposite the first substrate; providing a second substrate having at least one socket adapted to receive the optical/electrical I/O interconnect, wherein the socket includes a second material, wherein the second substrate includes a lead contact that communicatively connects the first substrate and the second substrate through the lead and an optical contact that communicatively connects the first substrate and the second substrate through the pillar; and causing the socket to receive a portion of the optical/electrical I/O interconnect.

In addition, the present invention provides for a method of directing optical energy and electrical energy simultaneously. The method can be broadly conceptualized as follows: providing a first substrate having at least one optical/electrical I/O interconnect that includes a pillar transversely extending from the first substrate, wherein the pillar includes a first material, the first material is optically conductive, and the pillar includes a lead disposed over a portion of the pillar extending from the base of the pillar on the first substrate to the end opposite the first substrate; providing a second substrate having at least one socket adapted to receive the optical/electrical I/O interconnect, wherein the socket comprises a second material, wherein the second substrate includes a lead contact that communicatively connects the first substrate and the second substrate through the lead and an optical contact that communicatively connects the first substrate and the second substrate through the pillar; communicating optical energy through the pillar of the first substrate to the optical contact of the second substrate; and communicating electrical energy through the lead of the first substrate to the lead contact of the second substrate.

Furthermore, the present invention provides for a method for forming a device. A representative method, among others, can be summarized by the following steps: providing a first substrate having at least one optical/electrical I/O interconnect that includes a pillar transversely extending from the first substrate, wherein the pillar comprises a first material, the first material is optically conductive, and the pillar includes a lead disposed over a portion of the pillar extending from the base of the pillar on the first substrate to the end opposite the first substrate; providing a second substrate having at least one socket adapted to receive the optical/electrical I/O interconnect, wherein the socket comprises a second material, wherein the second substrate includes a lead contact that communicatively connects the first substrate and the second substrate through the lead, wherein the second substrate includes an optical contact that communicatively connects the first substrate and the second substrate through the pillar; and causing the socket to receive a portion of the optical/electrical I/O interconnect.

Furthermore, the present invention provides for a method of aligning substrates. A representative method, among others, can be summarized by the following steps: providing a first substrate having at least one optical/electrical I/O interconnect that includes a pillar transversely extending from the first substrate, wherein the pillar comprises a first material, the first material is optically conductive, and the pillar includes a lead disposed over a portion of the pillar extending from the base of the pillar on the first substrate to the end opposite the first substrate; providing a second substrate having at least one socket adapted to receive the optical/electrical I/O interconnect, wherein the socket comprises a second material, wherein the second substrate includes a lead contact that communicatively connects the first substrate and the second substrate through the lead, wherein the second substrate includes an optical contact that communicatively connects the first substrate and the second substrate through the pillar; maintaining optical alignment between the first substrate and the second substrate using the optical/electrical I/O interconnect and the socket; and maintaining electrical interconnection between the first substrate and the second substrate using the optical/electrical I/O interconnect and the socket.

Other systems, methods, features, and advantages of the present invention will be, or become, apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the disclosed devices and methods can be better understood with reference to the following drawings. The components in the drawings are not necessarily to scale, emphasis instead being placed upon clearly illustrating the relevant principles. Moreover, in the drawings, like reference numerals designate corresponding parts throughout the several views.

FIG. 1A illustrates a cross-sectional view of a representative embodiment of an input/output (I/O) interconnection system, while FIG. 1B illustrates cross-sectional views of the non-flat compliant pillar (cross section a—a of FIG. 1A) and the compliant socket (cross section b—b of FIG. 1A).

FIG. 6 illustrates a cross-sectional view of a representative embodiment of a dual optical/electrical I/O interconnection system.

FIGS. 7A through 7F are cross-sectional views that illustrate a representative process for fabricating the dual optical/electrical I/O interconnection system illustrated in FIG. 6.

FIG. 14A illustrates a cross-sectional view of a representative embodiment of a polymer bridge, while

DETAILED DESCRIPTION

Figures 1A, 1B:
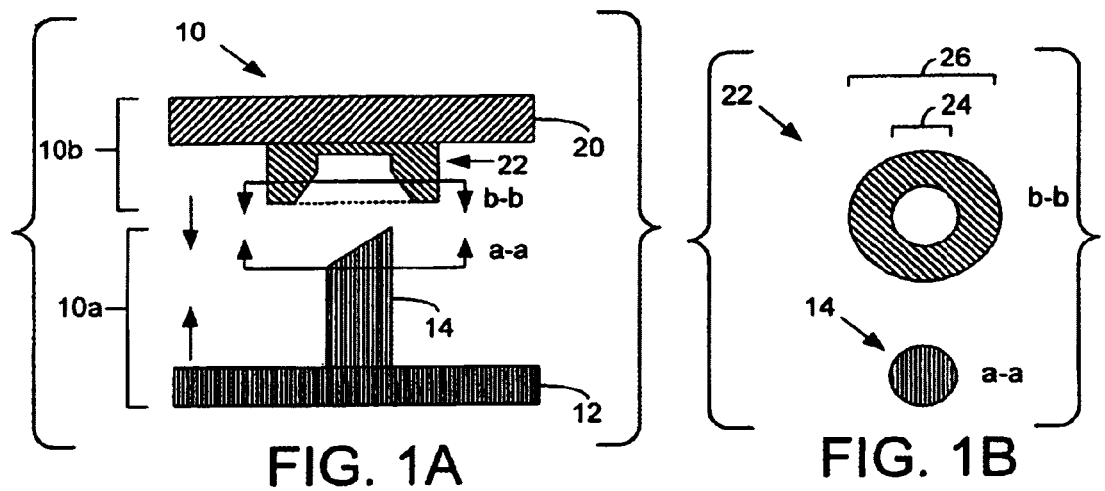

Devices and systems having one or more of the following components: a compliant pillar with a modified tip surface (non-flat tip) and a corresponding compliant socket; an optical/electrical I/O interconnect and a corresponding compliant socket; a lens/waveguide optical pillar, a polymer bridge, and a L-shaped pillar, are described herein. In addition, methods of making these components and methods of using these components are disclosed herein.

The types of devices that can use the compliant pillar, the optical/electrical I/O interconnect, the lens/waveguide optical pillar, the polymer bridge, the L-shaped pillar and their corresponding compliant sockets include, but are not limited to, high speed and high performance chips such as, but not limited to, microprocessors, communication chips, and optoelectronic chips.

The components can be fabricated of one or more materials that enhance compliance in-plane and out-of-plane (i.e., x-, y- axis and z-axis directions, respectively). The fabrication of the components with this material allows the components to be compliant in the x-, y- and/or z directions, which allows the components to be attached to a chip and/or printed board with a higher coefficient of thermal expansion without underfill, thus lowering costs and enhancing reliability. In addition, forming the compliant pillar, the optical/electrical I/O interconnect, the lens/waveguide optical pillar, and/or the corresponding compliant sockets, on a polymer bridge enhances compliance in the z-axis direction.

The compliant pillar, the optical/electrical I/O interconnect, the lens/waveguide optical pillar, and the L-shaped pillar are disposed substantially transversely (i.e., substantially vertical) to the substrate as shown in the FIGS. 1A, 1B, 6, 8, 11A, 11B, 17A, and 17B.

For optical interconnection, alignment should be maintained between the optical devices on the board and the chip during field service. As a result, it is important to mitigate the offset that may be introduced by thermal expansion mismatches between the chip and the board. This problem can, at least in part, be solved with a mechanically flexible (compliant) optical waveguide pillar that is perpendicular to the chip on which it is disposed. This mitigates optical losses due to offset. In addition, the optical waveguide pillars prevent light spreading as it is routed between two parallel surfaces, such as chip and a board.

Dual optical/electrical I/O interconnects allow for a single pillar to be used as a platform to communicate both optical energy (pillar waveguide) and electrical energy (electrical lead) energy or radio frequency (RF) energy (RF lead). The optical/electrical I/O interconnect can guide optical energy from a first substrate to a second substrate positioned substantially horizontal (e.g., substantially in the same plane as) to the first substrate, while also connecting an electrical signal via the lead from the first substrate to the second substrate. In one embodiment, the tip of the pillar can be a non-flat (e.g., slanted) surface and the metal from the lead can be disposed over the slanted portion of the tip. In this manner, the metal can be used as a mirror to direct the optical energy. In another embodiment, an element (e.g., grating coupler or mirror) can be used at the tip of the pillar to guide the optical energy. In still another embodiment, a mirror or grating coupler can be used on the second substrate to guide the optical energy out of the pillar.

Dual optical/electrical I/O interconnects are advantageous for at least the following reasons: 1) the same space is being used for electrical/optical I/O, and thus, there is a very high density of interconnections, 2) there is very high interconnect process integration between the two, 3) they can be made compliant, 4) they maintain alignment, 5) they can be wafer-level batch fabricated, and 6) the sockets aid in attachment.

In addition, the use of these components enables ultra high I/O density (e.g., about 10 to about 500,000 or more components per centimeter squared ($cm^2$)) to be achieved on the chip at wafer-level and printed board, which can enhance power distribution, increase I/O bandwidth, satisfy three-dimensional structural I/O demands, suppress simultaneous switching noise, improve isolation in mixed signal systems, and decrease costs. In addition, wafer-level functionality testing as well as wafer-level burn-in, which can be used to identify known good packaged die (KGPD), can be enhanced (e.g., reduced time and cost). Furthermore, for optical and RF interconnections, high density I/Os enable massive chip to board bandwidth.

The compliant pillar, the opticavelectrical I/O interconnect, the lens/waveguide optical pillar, the polymer bridge, and the L-shaped pillar, can be batch-fabricated at the wafer level, while each component's corresponding compliant socket can be batch-fabricated on a printed wiring/waveguide board or module.

Compliant Pillar/Compliant Socket Component Sets

Reference will now be made to the figures. FIG. 1A illustrates a cross-sectional view of a representative embodiment of an I/O interconnection system 10. The I/O interconnection system 10 includes a first structure 10a and a second structure 10b. The first structure 10a includes a first substrate 12 and a compliant pillar 14. The compliant pillar 14 includes a non-flat tip at the end opposite the first substrate 12. The second structure 10b includes a second substrate 20 and a compliant socket 22 adapted to receive the compliant pillar 14. The embodiment shown in FIGS. 1A and 1B illustrate that the inner surface of the compliant socket has a curved or slanted surface. FIG. 1B illustrates cross-sectional views of the compliant pillar (cross section a—a of FIG. 1A) and the compliant socket (cross section b—b of FIG. 1A).

The first substrate 12 can include, but is not limited to, electronic and optoelectronic chips. The first substrate 12 can include additional components such as, but not limited to, die pads, leads, input/output components, waveguides (e.g., optical and RF), air gaps, planar waveguides, polymer waveguides, optical waveguides having optical coupling elements such as diffractive grating coupler and mirrors disposed adjacent or within the optical waveguide, photodetectors, and optical sources such as VCSELS and LEDs.

The second substrate 20 can include, but is not limited to, a printed wiring board, a printed wiring/waveguide board, and appropriate mating substrates. The second substrate 20 can include additional components such as, but not limited to, die pads, leads, input/output components, waveguides (e.g., optical and RF), air gaps, planar waveguides, polymer waveguides, optical waveguides having optical coupling elements such as diffractive grating coupler and mirrors disposed adjacent or within the optical waveguide, photodetectors, and optical sources such as VCSELS and LEDs.

In general, materials that exhibit one or more of the following, (a) process compatibility with standard microelectronic fabrication processes, (b) suitable mechanical strength, flexibility, and durability, (c) sufficient lifetime and/or reliability characteristics, (d) low loss, and (e) photodefinability that can serve as the pillar material and/or the compliant socket material.

In another embodiment, the pillar material and/or the compliant socket material may need to have optical characteristics to guide optical energy such as transparency to a particular optical wavelength of light and/or process compatibility with other materials such that a contrast in refractive index is achieved. A reference describing polymer materials suitable for optical waveguide applications can be found in A. R. Blythe and J. R. Vinson, *Proc. 5$^{th}$ International Symposium on Polymers for Advanced Technologies*, Tokyo, Japan: pp. 601–11, August–December 2000, which is incorporated herein by reference.

In particular, the compliant pillar 14 and the compliant socket 22 can be made of a low modulus material such as, but not limited to, polyimides, epoxides, polynorbornenes, polyarylene ethers, and parylenes. In particular, the low modulus materials can include, but are not limited to, compounds such as Amoco Ultradel™ 7501, Promerus LLC's, Avatrel™ Dielectric Polymer, DuPont™ 2611, DuPont 2734, DuPont 2771, and DuPont 2555. Preferably, the compliant pillar and the compliant socket have been fabricated by photodefinition and additional processes using the polymer material Avatrel 2000P from Promerus, LLC, or the like, which have shown high optical quality and high compliance.

Furthermore, the compliant pillar 14 can be fabricated to have varying indices of refraction within different regions. For example, if a polymer pillar is 150 μm tall, the 50 μm closest to the first substrate 12 can have a first index of refraction, the next 50 μm can have a second index of refraction, and the last 50 μm (the end opposite the first substrate 12) can have a third index of refraction.

The compliant pillar 14 depicted in FIGS. 1A and 1B has a lateral circular cross section, while the compliant socket 22 as an inner 24 and an outer 26 lateral circular cross section. The inner lateral cross section 24 defines the area that receives the compliant pillar 14. Thus, when the first structure 12 and the second structure 20 are aligned and coupled, the compliant socket 22, in the area defined by the inner lateral cross section 24, receives a portion of the compliant pillar 14.

Embodiments of the compliant pillar 14 can be fabricated to be flexible in the x-, y- and/or z directions. In particular, the compliant pillar 14 exhibits greater flexibility and compliance in the x-, y- axis compared to the z-axis. However, fabrication of the compliant pillar 14 on a polymer bridge (described below) can enhance compliance in the z-axis direction.

It should be noted that the compliant pillar 14 and compliant socket 22 assist, in part, in aligning the first substrate 12 and second substrate 20. In order to make a permanent mechanical interconnection, a compatible material, such as polymers and epoxies, can be deposited within the sockets 22 to hold the pillars 14 in place. In particular, solder and conductive adhesives can be deposited for electrical interconnections, for example.

The cross sections of the compliant pillar 14 and the compliant socket 22 are not limited to the lateral circular cross section shown in FIG. 1B. Also, it should be noted that the lateral cross-sectional shape of the compliant pillar and the lateral cross-sectional shape of the socket do not have to be the same. For example, the lateral cross-sectional shape of the compliant pillar can be substantially hexagonal, while the lateral cross-sectional shape of the outer portion of the compliant socket is substantially circular. Also, note that the lateral inner cross-sectional shape of the compliant socket is substantially the same as the lateral cross-sectional shape of the compliant pillar. In general, the compliant socket should be slightly larger to allow easy entry of the compliant pillar into the inner opening. In addition, the inner sidewalls of the sockets may be slanted with a positive slope to enhance pillar to board alignment.

In addition, the compliant pillar 14 can have a cross section such as, but not limited to, a polygonal cross section, a circular cross section, and an elliptical cross section. The compliant socket 22 can have an inner lateral cross section such as, but not limited to, a polygonal cross section, a circular cross section, and an elliptical cross section. Likewise, the outer lateral cross section of the compliant socket 22 can have a cross section such as, but not limited to, a polygonal cross section, a circular cross section, and an elliptical cross section.

Figure 2A:
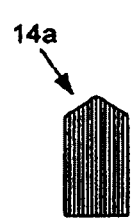
FIGS. 2A through 2I are lateral cross-sectional views of representative compliant pillars having a plurality of exemplary cross-sections.
Figure 2B:
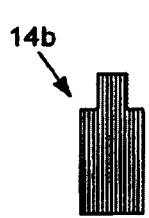
Figure 2C:
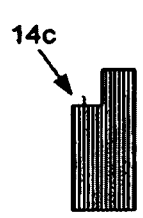
Figure 2D:
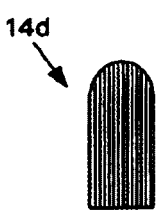
Figure 2E:
Figure 2F:
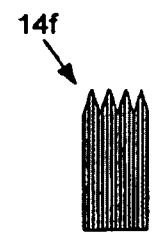
Figure 2G:
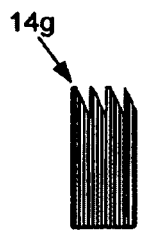
Figure 2H:
Figure 2I:
Figure 3A:
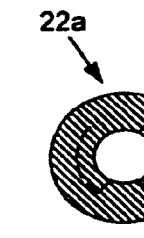
FIGS. 3A and 3B are cross-sectional views of representative compliant sockets having a plurality of exemplary cross-sections.
Figure 3B:
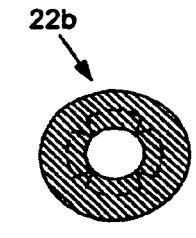

The non-flat tip of the compliant pillar 14 can have various topographies such as, but not limited to, the shapes illustrated in FIGS. 1A, 1B, and 2A through 2I. For example, the non-flat tip of the compliant pillar 14 can be rounded (FIG. 2D), pointed (FIG. 2A), or squared off on a portion of the tip (FIGS. 2B and 2C). In addition, the non-flat tip can be partially slanted (FIG. 2E), have teeth cut on a portion of the tip (FIGS. 2F, 2G, and 2I), or be concave (2H). The configurations illustrated in FIGS. 1A, 1B, and 2A through 2I are non-limiting and other non-flat tip configurations are included within the claimed subject matter. In general, the various types of tip topography can facilitate two different functions. A tip topography may enhance and/or assistant in making a better mechanical interconnection between the socket and the pillar (i.e., the tips in FIGS. 2B and 2C). In addition, a tip topography can be used for optical interconnection purposes (i.e., the tips in FIGS. 2E through 2I). As such, the relative scale of the tip topography for each function can vary significantly and the tip topography can be designed accordingly.

The compliant socket 22 can have various shapes such as, but not limited to, the shapes illustrated in FIGS. 1A and 1B and 3A and 3B. The slanted portion of the compliant socket 22 can include the entire inner circumference of the compliant socket 22 (FIGS. 1A and 1B), or be divided into a plurality of segments (e.g., two segments (FIG. 3A) and four segments (FIG. 3B)). The angle of the slope can vary depending on the application. Also, the slope can have ridges that resist the compliant pillar 14 from being pulled out of the compliant socket 22. In addition, the base of the compliant socket 22 can be made of a material other than a polymer or directly attached to the second substrate 20 as shown in FIG. 6. The configurations illustrated in FIGS. 1A, 2B, 3A, and 3B are non-limiting and other configurations are included within the claimed subject matter.

The compliant pillar 14 can have a height from about 5 to about 300 micrometers, a width of about 2 to about 150 micrometers, and a length of about 2 to about 150 micrometers. Preferably, the compliant pillar 14 can have a height from about 15 to about 150 micrometers, a width of about 5 to about 50 micrometers, and a length of about 5 to about 50 micrometers.

The type, size, and shape of the compliant pillar 14 and compliant socket 22 determine the compliancy of the compliant pillar 14 and the compliant socket 22. Therefore, selecting the type, size, and shape of the compliant pillar 14 and compliant socket 22 can, in part, control the amount of compliance.

In addition, the compliance of the polymer pillar is a function of the cure temperature (e.g., such as 180 to 200° C.) and time duration (e.g., such as 1 to 4 hours) of the cure temperature. For example, the cure temperature for Avatrel 2000P is from about 180 to 200° C. for a time duration of about 1 to 4 hours. Other polymers may have cure temperatures and time durations outside of the above stated range, but one skilled in the art can adjust experimental conditions as needed. The polymer pillar has a lateral compliance in the range of about 2 to 20 micrometers per milli-Newton. For example, compliant pillars about 100 micrometers tall and having a radius of about 55 micrometers wide yielded compliance in the range from 2.5 to 5 micrometers per milli-Newton. The compliant pillar yielded this range of values because of the cure conditions the pillars were subjected to after fabrication. Therefore, the value of compliance can be controlled by the cure conditions. In general, "stiff" compliant pillars can be fabricated under high cure temperature over long cure time conditions, while 'soft' compliant pillars can be fabricated under low cure temperature over short (or none) cure time conditions.

In general, taller pillars yielded higher compliance. However, it should be verified that the compliant pillars are not too "soft" in the transverse direction. This ensures that the pillars do not "crumble" during assembly or processing.

For the purposes of illustration only, and without limitation, embodiments of the present invention will be described with particular reference to the below-described fabrication methods. Note that not every step in the process is described with reference to the process described in the figures hereinafter. Therefore, the following fabrication processes are not intended to be an exhaustive list that includes every step required to fabricate the embodiments of the I/O interconnect system 10.

Figure 4A:
FIGS. 4A through 4F are cross-sectional views that illustrate a representative process for fabricating the non-flat compliant pillar illustrated in FIGS. 1A and 1B.
Figure 4B:
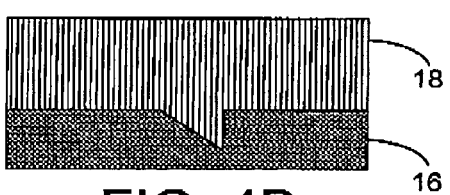

FIGS. 4A through 4F are cross-sectional views that illustrate a representative process for fabricating the compliant pillar 14 illustrated in FIGS. 1A and 1B. FIG. 4A illustrates the substrate 16, while FIG. 4B illustrates a pillar material layer 18 disposed upon the substrate 16. The pillar material layer 18 can be deposited on the substrate 16 by methods such as, for example, spin-coating, doctor-blading, and plasma deposition. The adhesion of the pillar material layer 18 to substrate 16 is such to allow later release of the defined pillar.

Figure 4C:
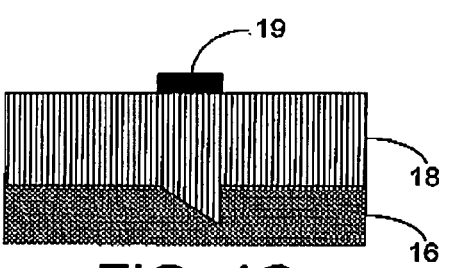

FIG. 4C illustrates the addition of the hard mask 19 disposed upon the pillar material layer 18. The hard mask 19 can be made of a mask material such as, but not limited to, any material that is selective to polymer etching, such as metals and silicon dioxide, for example. Alternatively, no hard mask is necessary when the compliant pillar is photo-defined.

Figure 4D:
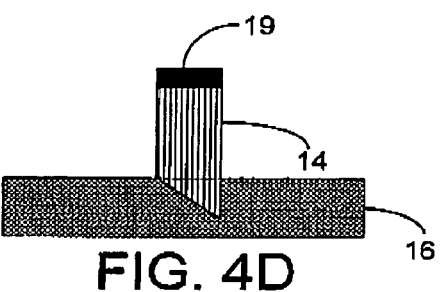

FIG. 4D illustrates the etching of the pillar material layer 18, which forms the compliant pillar 14. The pillar material layer 18 can also be formed using techniques such as, for example, reactive ion etching (RIE), wet etch, and laser drilling.

Figure 4E:
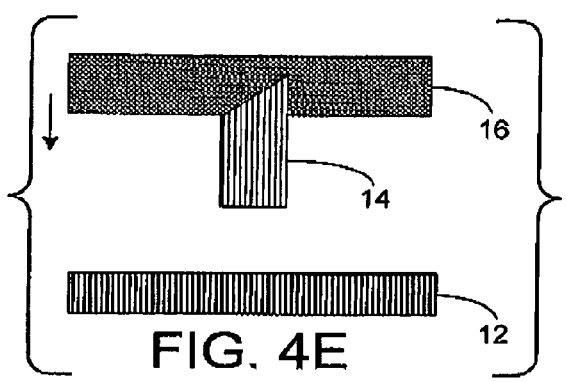
Figure 4F:
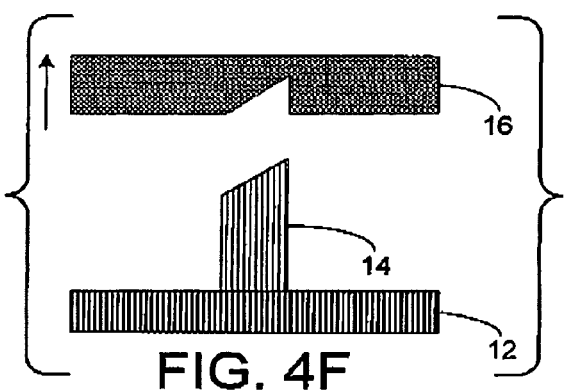

FIG. 4E illustrates the removal of the hard mask 19 and the introduction of the substrate 16 and compliant pillar 14 to the first substrate 12. FIG. 4F illustrates the first substrate 12 having the compliant pillar 14 disposed thereon. An adhesive on the first substrate 12 is used to adhere to the base of the compliant pillar 14. Once the compliant pillar 14 is introduced on the adhesive, the assembled system is heated to improve attachment prior to release of the substrate 16.

If the material layer 18 is photosensitive, the compliant pillar can be fabricated by exposing the material 18 in FIG. 4B through a mask to a light source with an appropriate wavelength. The mask contains the cross-sectional geometry of the compliant pillars. After exposure, the exposed material layer 18 may need a hard bake before developing. During developing, a wet chemical agent can be used to remove the non-exposed portions (for negative tone films) of the material to leave behind the compliant pillars (or sockets). As a result, no hard mask is needed for the fabrication processes.

Figure 5A:
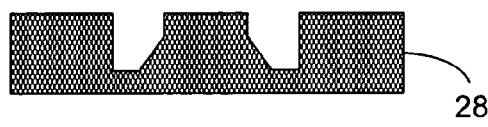
FIGS. 5A through 5F are cross-sectional views that illustrate a representative process for fabricating the compliant socket illustrated in FIGS. 1A and 1B.
Figure 5B:
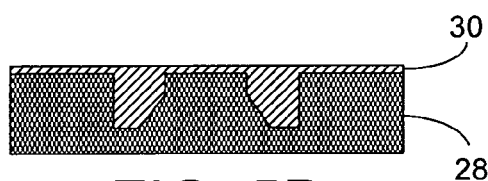

FIGS. 5A through 5F are cross-sectional views that illustrate a representative process for fabricating the compliant socket 22 illustrated in FIGS. 1A and 1B. FIG. 5A illustrates the substrate 28, while FIG. 5B illustrates a substrate material layer 30 disposed upon the substrate 28. The substrate material layer 30 can be deposited on the substrate 28 by methods such as, for example, spin-coating, doctor-blading, and plasma deposition.

Figure 5E:
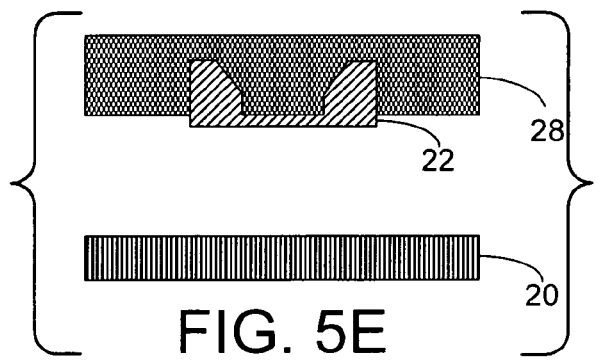
Figure 5C:
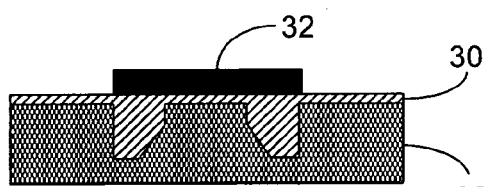

FIG. 5C illustrates the addition of the hard mask 32 disposed upon the substrate material layer 30. The hard mask 32 can be made of materials like those discussed above in reference to FIGS. 4A through 4F. Alternatively, no hard mask 32 is necessary when the compliant socket 22 is photodefined.

Figure 5D:
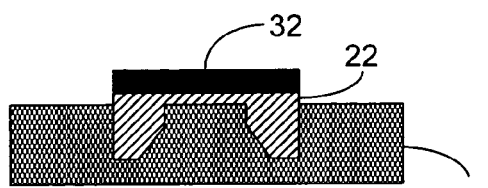
Figure 5F:
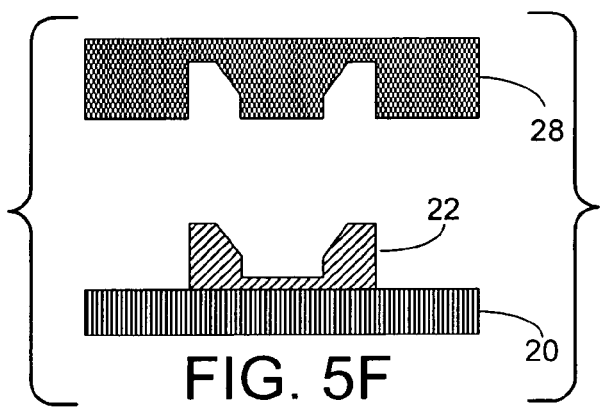

FIG. 5D illustrates the etching of the substrate material layer 30, which forms the compliant socket 22. The substrate material layer 30 can also be formed using techniques such as, for example, reactive ion etching (RIE), photo-definition, molding, and laser drilling. FIG. 5E illustrates the removal of the hard mask 32 from the compliant socket 22, and the introduction of the substrate 28 and compliant socket 22 to the second substrate 20. FIG. 5F illustrates the second substrate 20 having the compliant socket 22 disposed thereon.

In another representative process, the positive slope of the compliant socket 22 can be formed by directly depositing the material on the substrate 20 and then patterning it into the compliant socket. Next, the compliant socket 22 is heated to cause shrinkage of the sidewalls. Alternatively, RIE can be used to pattern the polymer material such that compliant sockets end up with slanted sidewalls. In yet another representative process, the positive slope of the compliant socket 22 can be formed by photodefinition of a positive scale photosensitive polymer. As mentioned above, the base portion of the compliant socket can be free of a polymer film.

Fabrication steps similar to that described above in reference to FIGS. 4A through 4F can be used if the substrate material layer 30 is photosensitive.

Dual Optical/Electrical I/O Interconnect Component Sets

FIG. 6 illustrates a cross-sectional view of a representative embodiment of a dual optical/electrical I/O interconnection system 40. Again, it should be noted that the figures and components are not to scale. For example, the mirrors shown may be much smaller in size than the planar waveguides shown. The dual optical/electrical I/O interconnect system 40 includes a first structure 40a and a second structure 40b. The first structure 40a includes a first substrate 12 and a dual optical/electrical I/O interconnection 41. In addition, the first substrate 12 includes, but is not limited to, a die pad 47, a first waveguide 42a, and a coupling element 46. The dual optical/electrical I/O interconnection 41 includes a pillar 44 and an electrical lead 48. The lead 48 can be deposited such that a metal or alloy fully encapsulates the pillar 44 except for an area for the optical interconnection path. Otherwise, the lead 48 may cover only a portion of the sidewall, as shown in FIG. 6. The second structure 40b includes a second substrate 20, a socket 54, a second waveguide 42b, and an electrical contact 56. The pillar 44 has a non-flat tip (slanted tip). The electrical lead 48 is disposed on a portion of the die pad 47 and on a portion of the pillar 44 extending over the slanted area of the pillar 44. The electrical lead 48 and pillar 44 form the optical/electrical I/O interconnect 41. The socket 54 includes a solder or other adhesive material 58 disposed therein. The socket 54 is adapted to receive the optical/electrical I/O interconnect 41. In addition, the pillar 44 and/or the socket 54 can be fabricated from compliant materials that allow the pillar and socket to be compliant. The first substrate 12 and the second substrate 20 can include additional components, as described above. The electrical lead 48 can include material that is highly reflective to the optical signal wavelength.

Alternatively, without the metal lead air can be used as the waveguide cladding because no underfill is required for the pillar 44 since the pillar 44 is laterally compliant. This enables them to compensate for the different thermo-mechanical expansions between the chip and the board. Thus, optical/electrical I/O interconnection 41 mitigate the offsets introduced due to expansion mismatches and nonplanarity. The air cladding and the resulting high index of refraction difference (Δn) between the core and the cladding has the benefit of confining the optical wave and thus minimizing crosstalk. Air cladding also has two additional benefits when compared to non-air cladding in this application: 1) the pillar 44 can guide an optical wave through larger bends (due to large Δn), which means higher compliance, and 2) the air cladding does not impose any mechanical/physical constraints on the movement of the pillar 44. Thus, air waveguide cladding offers the lowest index of refraction possible and is the least mechanically-resistant material. However, the pillar 44 may be passivated with any cladding material, if desired.

The pillar 44 and the socket 54 can be made of materials similar to those discussed in reference to FIGS. 1A, 1B, 2A through 2I, 3A, and 3B. In addition, the size and shape of the pillar 44 and compliant socket 54 can be similar to those discussed in reference to FIGS. 1A, 1B, 2A through 2I, 3A, and 3B. For example, the compliant pillar 44 can be pointed, partially slanted, or have teeth cut on a portion of the tip. The configuration illustrated in FIG. 6 is non-limiting and other non-flat tip configurations are included within the claimed subject matter.

The pillar 44 can have a height from about 5 to about 300 micrometers, a width of about 2 to about 150 micrometers, and a length of about 2 to about 150 micrometers. Preferably, the pillar 44 can have a height from about 30 to about 150 micrometers, a width of about 5 to about 50 micrometers, and a length of about 5 to about 50 micrometers. The socket 54 can have a height from about 5 to 30 micrometers and a width of about 1.1 to 4 times the width of the compliant pillar.

In embodiments where the pillar 44 is made of a compliant material (like those discussed in reference to FIGS. 1A, 1B, 2A through 2I, 3A and 3B), the pillar 44 is flexible in the x-, y- and/or -z directions and therefore, no underfill is needed. The fabrication of the electrical lead 48 disposed on the pillar 44 may lower the compliancy of the aggregate structure. The compliance of the pillar 44 tends to decrease with the fabrication of metal on its sidewalls because the metal has a much higher stiffness than polymers and tends to plastically deform. The thickness of metal is preferably selected such that it yields low parasitic electrical interconnection without disturbing the high compliance of the intrinsic polymer pillars, and is highly reflective to the optical wavelength of interest.

The type, size, and shape of the pillar 44 and compliant socket 54 determine the compliancy of the pillar 44 and the compliant socket 54. Therefore, selecting the type, size, and shape of the pillar 44 and compliant socket 54 can, in part, control the amount of compliance.

The pillar 44 functions as a medium through which optical energy travels. As such, the pillar 44 can communicate optical energy from the first substrate 12 to the second substrate 20 using one or more waveguides that may include one or more coupling elements and/or one or more mirrors. The waveguides, coupling elements, and/or the mirrors can be included within and/or disposed upon the first or second substrate 12 and 20. As illustrated in FIG. 6, the first substrate 12 includes the first waveguide 42a having the coupling element 46 disposed adjacent the pillar 44 (as demonstrated in R. Chen, et al., "Fully Embedded Board-Level Guided-Wave Optoelectronic Interconnects," *Proc. IEEE*, Vol. 88, pp.780–793, June 2000 incorporated herein by reference). The lead 48 disposed on the pillar 44 acts as a mirror on the non-flat tip (slanted portion) of the pillar 44. The second substrate 20 includes the second waveguide 42b. Therefore, optical energy can be directed into the pillar 44 via the first waveguide 42a and the coupling element 46 disposed on the first substrate 12, guided by the pillar 44, and directed by the mirror (lead) into the second waveguide 42b disposed on the second substrate 20.

If the second waveguide 42b is terminated with a mirror (R. Chen, et al., "Fully embedded board-level guided-wave optoelectronic interconnects," *Proc. IEEE*, Vol. 88, pp.780–793, June 2000, which is incorporated herein by reference) or a diffractive grating coupler (S. Schultz, et al., "Design, fabrication, and performance of preferential-order volume grating waveguide couplers," *Appl. Opt.*, vol. 39, pp.1223–1232, March 2000, which is incorporated herein by reference), then the pillar 44 without a coupling element would be placed above that terminated region of the second waveguide 42b.

In one embodiment, the pillar does not have a slanted tip, but rather has a diffractive grating coupler disposed on the tip of the compliant pillar. A pillar having a diffractive grating coupler disposed on the tip of the pillar can be made in a manner similar as the structure described in FIGS. 8 and 9A through 9I and the accompanying text. In this case, the diffractive grating coupler can be placed adjacent to or above the optical waveguide 42b. It should be noted that there is freedom with respect to the choice of the optical element to be used to mitigate the surface-normal (right-angle) bends and to its location (on the pillar 44 or waveguide 42b).

Moreover, the index of refraction of the socket material may be lower than that of the compliant pillar waveguide.

The first waveguide 42a and second waveguide 42b can be defined through multiple fabrication processes such as, but not limited to, photo-definition, wet chemical etching, dry plasma etching, thermally-induced refractive index gradients, and ion implantation. In addition, the first waveguide 42a and second waveguide 42b can have geometries such as, for example, raised strip geometry, buried geometry, and rib geometry.

The coupling element 46 can include mirrors, planar (or volume) grating couplers, evanescent couplers, surface-relief grating couplers, and total internal reflection couplers, for example. More specifically, when the coupling element 46 is a volume grating coupler, the coupling material can be laminated or spin-coated onto the appropriate surface. In particular, a laminated volume grating coupler can be formed by holographic exposure of the grating region following lamination of the grating material. Alternatively, the laminated volume grating coupler can be formed by holographic exposure prior to lamination of the grating material. In the case where the coupling element 46 is to be formed inside of the compliant pillar waveguide, the compliant pillar waveguide and coupler can be composed of separate materials. Additional details regarding grating couplers can be found in U.S. Pat. No. 6,285,813, which is incorporated herein by reference.

If the coupling element 46 is a grating coupler, then the grating coupler material includes materials such as, for example, polymer materials, silver halide photographic emulsions, photoresists such as dichromated gelatin, photopolymers such as polymethyl methacrylate (PMMA) or Dupont™ HRF photopolymer films, for example, thermoplastic materials, photochromic materials such as crystals, glasses or organic substrates, photodichroic materials, and photorefractive crystals such as lithium niobate, for example. These materials have the characteristics of creating a refractive index modulation through a variety of mechanisms, all of which result in the creation of a phase or absorption or mixed grating. Other suitable materials are described in T. K. Gaylord and M. G. Moharam, *Proc. IEEE*, vol. 73, pp. 894–937, May 1985, which is herein incorporated by reference. The fabrication of a grating coupler is preferred to be done on the pillar, and thus at the wafer-level, where nano-lithography is readily available. To fabricate such a device on the printed wiring/waveguide board would potentially be expensive.

An additional feature of the pillar 44 is that portions of the pillar 44 not bound by the socket 54 are surrounded by air, which acts as an air-gap cladding layer. The advantages of the air-cladding in this application are described above. It should be pointed out that some of the material requirements for conventional optical interconnects do not necessarily apply to the pillar 44. For example, the materials are not restricted to ultra-low absorption optical materials due to the short height (below 300 micrometers) of the compliant pillar.

The socket 54 shown in FIG. 6 includes a solder material 58 to assist in the attachment of the lead to the socket 54. The solder material 58 can be a material such as, but not limited to, lead and lead-free solder such as tin-lead and tin-copper-silver alloy solders. In addition, conductive adhesives can also be used as the solder material.

The die pad 47 is assumed to already exist on the die that the pillars 44 are fabricated on. Otherwise, the die pad 47 can be deposited upon the surface of the first substrate 12 using techniques such as, for example, sputtering, evaporation, electron-beam deposition, electroplating, electro-less plating, and displacement reactions.

The geometry of the leads 48 that can be used in embodiments of the present invention is not limited to that shown in FIG. 6. Instead, various lead 48 geometries can provide compliance consistent with the scope of the present invention. Additional steps can be performed to fabricate an attachment or contact on the end portion of the electrical lead. This contact (not shown) can include a variety of items designed to contact or attach to a pad or point on another substrate. These contacts can be, for example, a solder bump or a conductive adhesive.

The lead 48 can be an electrical lead or a radio frequency lead. The lead 48 can be fabricated of one or more layers of metals, metal composites, conductive adhesives, or combinations thereof, appropriate for the electrical/optical I/O interconnect system 40. The metals and metal composites include, but are not limited to, gold, gold alloys, copper, and copper alloys. The lead 48 can be fabricated by monolithically electroplating the selected metal or metal composite onto the first substrate.

The lead 48 can have a thickness that ranges from about 0.1 to about 30 micrometers, and preferably from about 0.1 to about 5 micrometers. The preferred embodiment of the lead 48 has a thickness of about 2 micrometers. The lead 48 can have lengths that range from about 2 to about 300 micrometers, and preferably from about 30 to about 150 micrometers. The lead 48 can have a width that ranges from about 1 to about 100 micrometers, and preferably from about 2 to about 40 micrometers. The lead 48 can have a height that ranges from about 10 to about 300 micrometers, and preferably from about 30 to about 150 micrometers. As mentioned above, the lead 48 can be disposed over a large portion of the pillar 44 (e.g., except the area used for optical transmission), so that the dimensions of the lead 48 may be very similar to that of the pillar 44.

For the purposes of illustration only, and without limitation, embodiments of the present invention will be described with particular reference to the below-described fabrication methods. Note that not every step in the process is described with reference to the process described in the figures hereinafter. Therefore, the following fabrication processes are not intended to be an exhaustive list that includes every step required to fabricate the embodiments of the optical/electrical I/O interconnect system 40.

FIGS. 7A through 7F are cross-sectional views that illustrate a representative process for fabricating the pillar 44 illustrated in FIG. 6. FIG. 7A illustrates the molding substrate 60, while FIG. 7B illustrates a pillar material layer 50 disposed upon the molding substrate 60 as well as the addition of a hard mask 52. The pillar material layer 50 can be deposited on the molding substrate 60 by methods such as, for example, spin-coating, doctor-blading, and plasma deposition. The hard mask 52 can be made of a mask material such as, but not limited to, any material that is selective to polymer etching, such as metals and silicon dioxide, for example. Alternatively, no hard mask is necessary when the compliant pillar is photodefined.

FIG. 7C illustrates the etching of the pillar material layer 50, which forms the pillar 44. The pillar material layer 50 can also be formed using techniques such as, for example, reactive ion etching (RIE), wet etch, and laser drilling.

FIG. 7D illustrates the removal of the mask 52 and the introduction of the molding substrate 60 and pillar 44 to the first substrate 12. FIG. 7E illustrates the first substrate 12 having the compliant pillar 44 disposed thereon. FIG. 7F illustrates the formation of the lead 48 on a portion of the die pad 47 and the pillar 44.

If the material layer 50 is photosensitive, the compliant pillar can be fabricated by exposing the material 50 in FIG. 7B through a mask to a light source with an appropriate wavelength. The mask contains the cross-sectional geometry of the compliant pillars. After exposure, the exposed material layer 50 may need a hard bake before developing. During developing, a wet chemical agent can be used to remove the non-exposed portions (for negative tone films) of the material to leave behind the compliant pillars (or sockets). As a result, no hard mask is needed for the fabrication processes.

The compliant socket can be fabricated in a manner similar to the method described in FIGS. 4A through 4F and the corresponding text.

Modified-Tip Topograhry for Pillars

In general, the tip of a pillar can be modified from a flat tip to a non-flat tip by forming the pillars as described above in FIGS. 1A, 1B, and 2A through 2I. In addition, the tip of the pillar can be modified by forming a coupling element, a mirror, or lens, on the tip of the pillar. The modified-tip topography can be used to alter the direction (e.g., direct into a different direction or directions and/or focus the optical energy) of optical energy out of or into the compliant pillar. For example, a concave mirror disposed on the pillar (not shown) can couple optical energy from the polymer pillar into a slab waveguide in the event that the cross-sectional size and geometry of the pillar and waveguide are not the same. Alternatively, a cylindrical polymer pillar can be used as a converging lens to focus optical energy into a coupling element on a slab waveguide (not shown). The mirror and lens could be used together or separately to focus optical energy.

Figure 8:
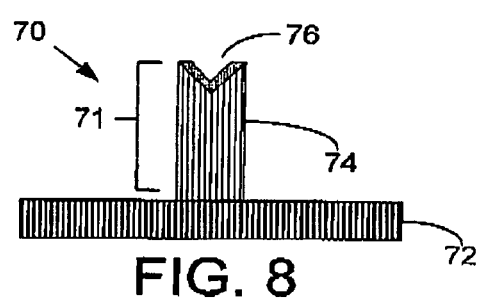
FIG. 8 illustrates a cross-sectional view of a representative embodiment of a pillar having a non-flat modified-tip.
Figure 11A:
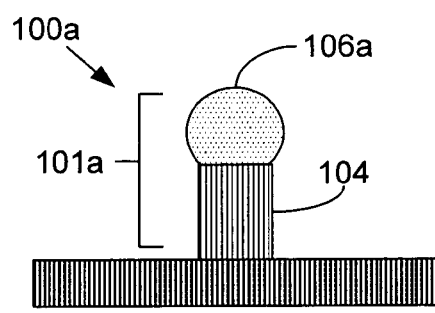
FIGS. 11A and 11B illustrate cross-sectional views of representative embodiments of a pillar having a lens disposed of the tip of the pillar.
Figure 11B:
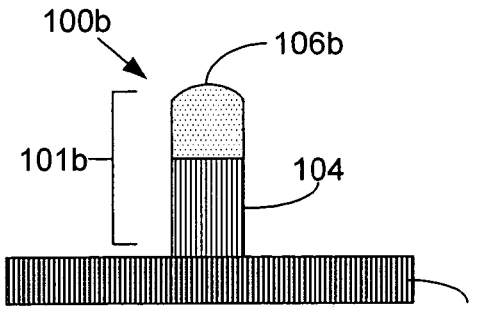

FIGS. 8, 11A, and 11B illustrate two representative embodiments of pillars having modified-tip topography. FIG. 6 is also representative of an embodiment of a pillar with modified-tip topography (i.e., with one mirror instead of two as in FIG. 8). These embodiments are non-limiting and other modified-tip topographies are included within the claimed subject matter.

FIG. 8 illustrates a cross-sectional view of a representative embodiment of a modified-tip structure 70 with a modified-tip pillar 71. The structure 70 includes, but is not limited to, substrate 72, a pillar 74, and mirrors 76 disposed in the tip of the pillar 74. The modified-tip pillar 71 includes the pillar 74 and the mirrors 76. The pillar 74 acts as an optical waveguide similar to the pillars 14 and 44 described above.

The substrate 72 can include, but is not limited to, the components described above in reference to the first and second substrates 12 and 20. The pillar 74 can be made of similar materials as the pillars described above in reference to FIGS. 1A, 1B, and 2A through 2I. In addition, the type, size, and shape of the pillar 74 can be similar to the pillars described above in reference to FIGS. 1A, 1B, and 2A through 2I.

The mirrors 76 can be fabricated from mirror material such as, but not limited to, a slanted polymer coated with a metal film, and unmetallized slants for total internal reflection mirrors.

The mirrors 76 illustrated in FIG. 8 can direct optical energy in two directions. However, additional embodiments can include mirrors that direct optical energy in one or more directions.

For the purposes of illustration only, and without limitation, embodiments of the present invention will be described with particular reference to the below-described fabrication methods. Note that not every step in the process is described with reference to the process described in the figures hereinafter. Therefore, the following fabrication processes are not intended to be an exhaustive list that includes every step required to fabricate the embodiments of the modified-tip structure 70.

Figure 9F:
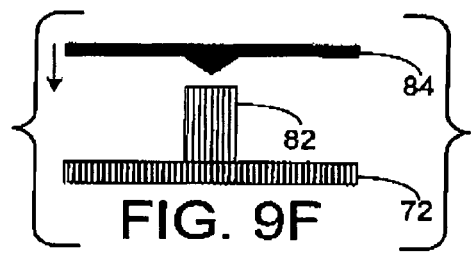
FIGS. 9A through 9J are cross-sectional views that illustrate a representative process for fabricating the non-flat modified pillar illustrated in FIG. 8
Figure 9G:
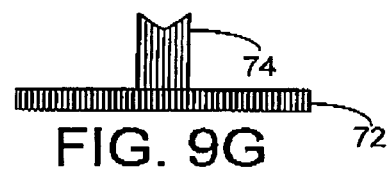
Figure 9A:
Figure 9B:

FIGS. 9A through 9J are cross-sectional views that illustrate a representative process for fabricating the modified-tip structure 70 having the modified-tip pillar 71 illustrated in FIG. 8. FIG. 9A illustrates the substrate 72, while FIG. 9B illustrates a pillar material layer 78 disposed upon the substrate 72. The pillar material is similar to the pillar material described above. The pillar material layer 78 can be deposited on the substrate 72 by methods such as, for example, spin-coating, doctor-blading, and plasma deposition.

Figure 9C:
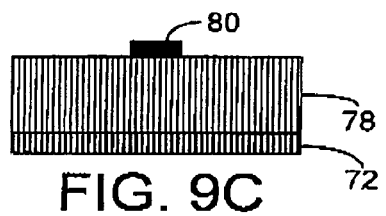

FIG. 9C illustrates the addition of a hard mask 80 to the pillar material layer 78. The hard mask 80 can be made of a mask material such as, but not limited to, any material that is selective to polymer etching, such as metals and silicon dioxide, for example. Alternatively, no hard mask is necessary when the compliant pillar is photodefined.

Figure 9H:
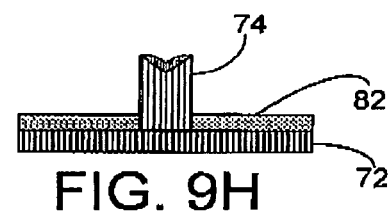
Figure 9I:
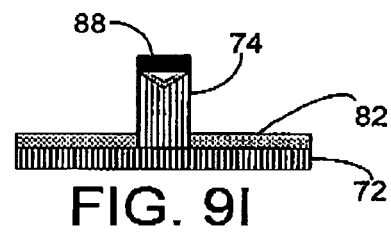
Figure 9D:
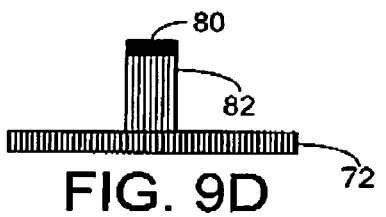

FIG. 9D illustrates the etching of the pillar material layer 78, which forms the unmodified pillar 82. The pillar material layer 78 can also be formed using techniques such as, for example, reactive ion etching (RIE), wet etch, and laser drilling.

Figure 9J:
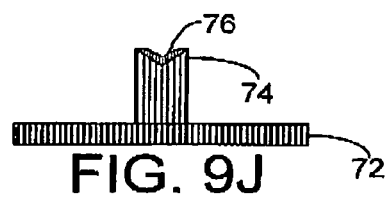
Figure 9E:
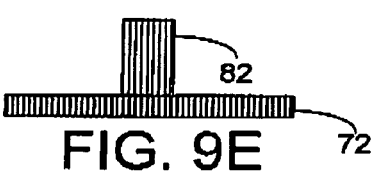

FIG. 9E illustrates the removal of the hard mask 80, while FIG. 9F illustrates the introduction of the substrate 72 and unmodified pillar 82 to the impression mold 84. The impression mold can be used to indent or modify the tip of the unmodified pillar 82. The impression mold can take various shapes (i.e., sawtooth cutouts) and is dependent upon the component that is going to be formed on the tip of the pillar.

Other methods for indenting or modifying the tip of the unmodified pillar 82 may include, but are not limited to, thermally curing the unmodified pillar 82 while the mold pattern is impressed against the unmodified pillar 82 or heating and pressing the impression mold 84 on the pillar to cause local heating and local deformation. These processes can be performed after the polymer film application and softbake (FIG. 9B). Another method for indenting or modifying the unmodified pillar 82 may include, but is not limited to, spin coating the polymer, 70% soft baking, molding the film while finishing the soft bake process step, removing the mold, and then photoimaging. The slanted surfaces on the tip of the pillar 74 can also be formed by reactive ion etching (RIE). A reference describing RIE of slanted surfaces can be found in G. Boyd et al. "Directional Reactive Ion Etching at Oblique Angles," *Appl. Phys. Lett.*, vol. 36, no., 7, pp. 583–585, April 1980, which is incorporated herein by reference.

FIG. 9G illustrates the pillar 74 after the tip has been modified. FIG. 9H illustrates a mirror layer 82 disposed upon the substrate 72 and pillar 74. The mirror layer 82 can be deposited on the substrate 72 by methods such as, for example, sputtering, or electron beam evaporation.

FIG. 9I illustrates the addition of a hard mask 88 over a portion of the mirror layer 82 disposed over the modified-tip of the pillar 74. The hard mask 88 can be made of a mask material such as, but not limited to, any material that is selective to polymer etching, such as metals and silicon dioxide, for example. Alternatively, no hard mask is necessary when the compliant pillar is photodefined.

FIG. 9J illustrates the mirror layer 82 etched away, which forms the mirrors 76 on the tip of the pillar 74. The mirror layer 82 can also be etched using techniques such as, for example, reactive ion etching (RIE), wet etch, and laser drilling. It should be noted that the fabrication process described in FIGS. 7A through 7F could be used to fabricate modified-tip structure 70.

Figure 10:
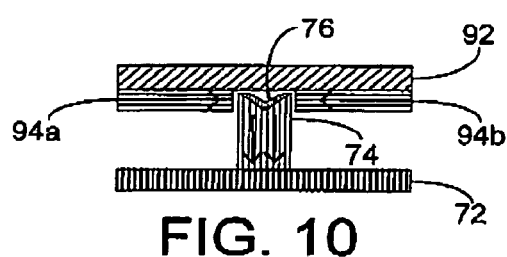
FIG. 10 illustrates a cross-sectional view of optical energy traversing through the modified pillar of FIG. 8.

FIG. 10 illustrates the path that optical energy can travel using the modified-tip pillar 71 shown in FIG. 8. Initially, the optical energy travels from two directions through waveguides 94a and 94b disposed on substrate 92. Upon encountering the mirrors 76, the optical energy is diverted into the modified-tip pillar 71. FIG. 10 is only an illustrative example of how the modified-tip pillar 71 can be used. The importance of such an interconnection depends on the overall architecture of the system. It may be necessary to have two chips communicating to the same location on a third chip, for example. FIGS. 11A and 11B illustrate another type of modified-tip pillar in which the modified-tip structures 100a and 100b have lenses 106a and 106b disposed on the pillar 104. The lenses 106a and 106b can be used to focus optical energy into or out of the pillar 104. The modified-tip structures 100a and 100b include, but are not limited to, a substrate 102, a pillar 104, and a lens 106a and 106b, respectively. The pillar 104 acts as an optical waveguide similar to the pillars 14 and 44 described above.

The substrate 102 can include, but is not limited to, the components described above in reference to the first and second substrates 12 and 20. The pillar 104 can be made of similar pillar materials as the pillars described above in reference to FIGS. 1A, 1B, and 2A through 2I. In addition, the type, size, and shape of the pillar 104 can be similar to the pillars described above in reference to FIGS. 1A, 1B, and 2A through 2I.

The lens can take the form of that shown in FIG. 11A or 11B. The lenses 106a and 106b can be fabricated from lens materials such as, but not limited to, polymers that exhibit good adhesion and the desired optical properties. The lenses 106a and 106b can be formed by dipping the pillar 104 into a lens material layer (which is still in semi-liquid form) at room temperature or above, so that a portion of the lens material is disposed onto the tip of the pillar 104 and forms a lens.

For the purposes of illustration only, and without limitation, embodiments of the present invention will be described with particular reference to the below-described fabrication methods. Note that not every step in the process is described with reference to the process described in the figures hereinafter. Therefore, the following fabrication processes are not intended to be an exhaustive list that includes every step required to fabricate the embodiments of the modified-tip structure 100a.

Figure 12A:
FIGS. 12A through 12F are cross-sectional views that illustrate a representative process for fabricating the pillar illustrated in FIG. 11A.
Figure 12B:

FIGS. 12A through 12F are cross-sectional views that illustrate a representative process for fabricating the modified-tip structure 100a illustrated in FIG. 11A. FIG. 12A illustrates the substrate 102, while FIG. 12B illustrates a pillar material layer 108 disposed upon the substrate 102. The pillar material layer 108 can be deposited on the substrate 102 by methods such as, for example, spin-coating, doctor-blading, and plasma deposition.

Figure 12C:
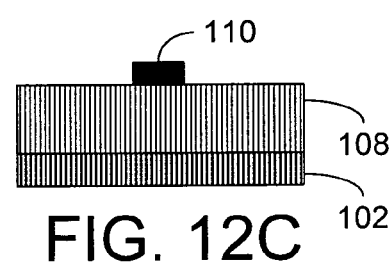

FIG. 12C illustrates the addition of a hard mask 110 to the pillar material layer 108. The hard mask 110 can be made of a mask material such as, but not limited to, any material that is selective to polymer etching, such as metals and silicon dioxide, for example. Alternatively, no hard mask is necessary when the compliant pillar is photodefined.

Figure 12D:
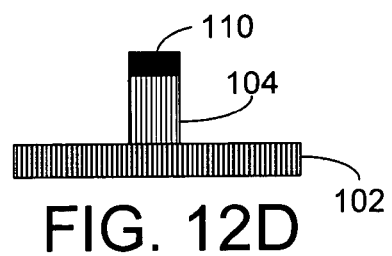

FIG. 12D illustrates how the pillar material layer 108 is etched to form the pillar 104. The pillar 104 can also be formed using techniques such as, for example, reactive ion etching (RIE), wet etch, and laser drilling.

Figure 12E:
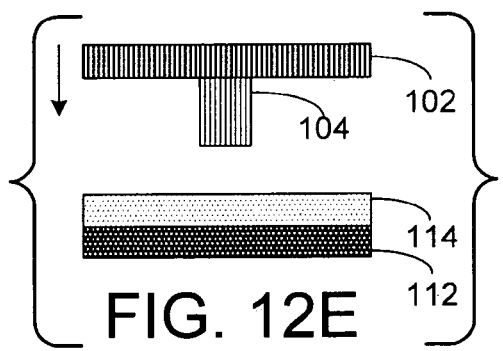
Figure 12F:
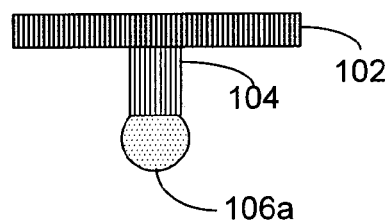

FIG. 12E illustrates the removal of the mask 110 and illustrates the introduction of the substrate 102 and pillar 104 to the lens material 114 disposed onto substrate 112. The lens material 114 is in liquid form and can be heated to temperatures ranging from room temperature to 150° C., for example. Thus, when the substrate 102 and pillar 104 are dipped into the lens material 114, the lens 106a forms on the tip of the pillar 104 as a spherelike ball, due to surface tension. FIG. 12F illustrates the modified-tip pillar 101a after the lens is disposed onto the pillar tip. Disposing of the lens onto the pillar tip by this process allows for different indices of refraction as well as the same index of refraction between the pillar and lens.

Alternatively, a pillar 104 with concave/convex tip may be fabricated by locally heating the tips of the polymer pillar 104 to cause local melting. Then, removing the heat source allows the molten polymer to cool, resolidify, and remain spherical. Such a process also allows for batch fabrication.

Furthermore, if the lens material 114 is photosensitive, the removal of the lens from some pillars while leaving the others intact in a batch process can be facilitated by using a mask. A mask can also be used to modify the shape of the lens or fabricate surface relief diffractive elements on the lenses.

Figure 13:
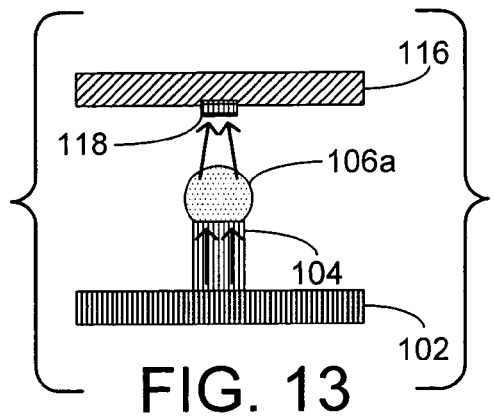
FIG. 13 illustrates a cross-sectional view of optical energy traversing through the pillar of FIG. 11A.

FIG. 13 illustrates the path that optical energy can travel using the modified-tip pillar 101a shown in FIG. 11A. Initially, the optical energy travels through the pillar 104. Upon encountering the lens 106a, the optical energy is focused onto a component 118 (e.g., a detector, waveguide, or coupling element) disposed on substrate 116. FIG. 14 is only an illustrative example of how the modified-tip pillar 101a can be used. For example, the optical energy could also be focused on a component (e.g., a detector, waveguide, or coupling element) disposed under the surface of the substrate 116. Further, a compliant socket can be disposed on the substrate 116, the compliant socket being analogous to the compliant socket 22 in FIGS. 1A and 1B. The compliant socket can allow z-axis alignment of the modified-tip pillar 101a and the buried component in the substrate 116.

Polymer Bridge

In general, polymer bridges can be used to add z-axis compliance by disposing one or more compliant pillars, the optical/electrical I/O interconnects, the lens/waveguide optical pillars, and/or the corresponding compliant sockets, upon the polymer bridge. The polymer bridge includes a polymer region that spans across an area that does not have any material disposed thereunder.

Figure 14A:
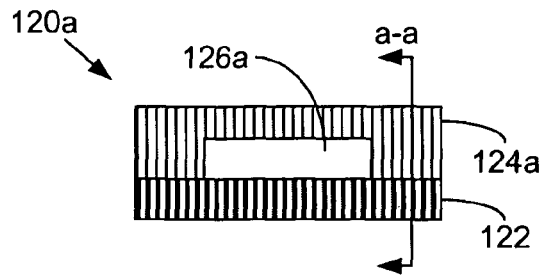
Figure 14B:
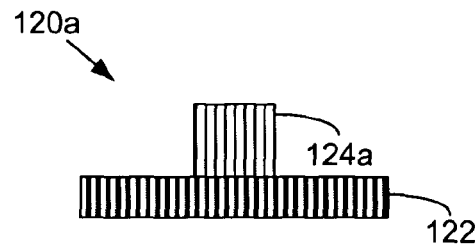
FIG. 14B illustrates another cross-sectional view of the polymer bridge (cross section a—a of FIG. 14A).

FIG. 14A illustrates a cross-sectional view of a polymer bridge 124a, while FIG. 14B illustrates the cross-section of the polymer bridge 124a with respect to the a—a cross-section. The polymer bridge structure 120a includes a substrate 122, a polymer bridge 124a, and an unbound air-gap region 126a. The unbound air-gap region is not enclosed by the polymer bridge 124a.

Figure 15A:
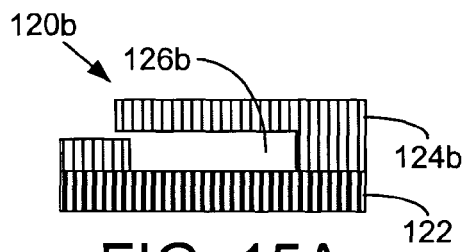
FIGS. 15A through 15C illustrate cross-sectional views of representative embodiments of polymer bridges.
Figure 15B:
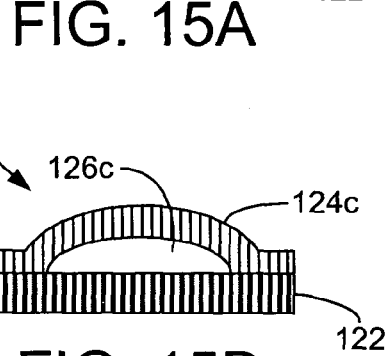
Figure 15C:
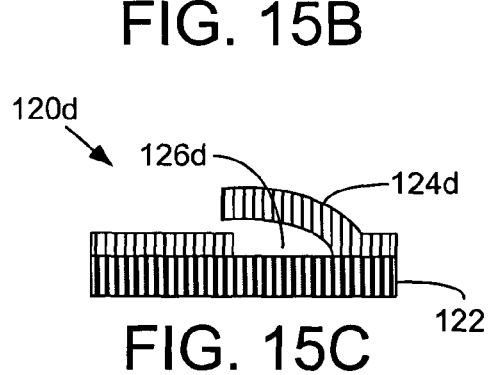

FIGS. 15A through 15C illustrate cross-sectional views of additional representative embodiments of polymer bridges 120b ... 120d. The configuration of the polymer bridge can include additional configurations to those described in FIGS. 14A and 14B and 15A through 15C.

The substrate 122 can include, but is not limited to, the components described above in reference to the first and second substrates 12 and 20. The polymer bridge material can be made of materials such as, but not limited to, the materials discussed in reference to FIGS. 1A, 1B, 2A through 2I, 3A and 3B for the pillars and sockets.

The unbound air-gap region 126a, 126b, 126c, or 126d can be formed by the removal (e.g., decomposition or removal of photoresist) of a sacrificial layer from the area in which the unbound air-gap region 126 is to be located. The unbound air-gap region 126 occupies a space bounded, in part, by the polymer bridge 124 and the substrate 122.

Generally, during the fabrication process, the sacrificial layer is deposited onto the substrate 122. Thereafter, the polymer material layer 124 is deposited over a portion of the sacrificial layer. Subsequently, the sacrificial layer is removed forming the unbound air-gap region 126a. The processes for depositing and removing the sacrificial layer are discussed in more detail hereinafter.

The sacrificial layer can be polymers that have a decomposition temperature less than the decomposition or degradation temperature of the polymer bridge material. Examples of the sacrificial layer include compounds such as, but not limited to, polynorbornenes, polycarbonates, polyethers, and polyesters. More specifically the sacrificial layer includes compounds such as BF Goodrich Unity™ 400, polypropylene carbonate, polyethylene carbonate, and polynorborene carbonate. The sacrificial layer may also contain photosensitive compounds, which are additives for patterning or decomposition. The sacrificial material may include photoresists or metals.

The sacrificial layer can be deposited using techniques such as, for example, spin coating, doctor-blading, sputtering, lamination, screen or stencil-printing, melt dispensing, chemical vapor deposition (CVD), and plasma based deposition systems.

The height of the unbound air-gap region 126a can range from about 5 to 80 micrometers. The dimensions of the polymer bridge 124a can range from about 5 to 500 micrometers in length, about 3 to 30 micrometers in thickness, and about 5 to 500 micrometers in width.

For the purposes of illustration only, and without limitation, embodiments of the present invention will be described with particular reference to the below-described fabrication methods. Note that not every step in the process is described with reference to the process described in the figures hereinafter. Therefore, the following fabrication processes are not intended to be an exhaustive list that includes every step required to fabricate the embodiments of the polymer bridge structure 120a.

Figure 16A:
FIGS. 16A through 16D illustrate cross-sectional views of a representative process for fabricating the polymer bridge illustrated in FIG. 14A.
Figure 16B:
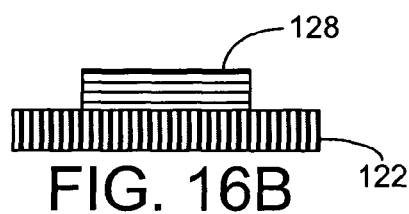

FIGS. 16A through 16D are cross-sectional views that illustrate a representative process for fabricating the exemplary polymer bridge 124a illustrated in FIGS. 14A and 14B. FIG. 16A illustrates the substrate 122, while FIG. 16B illustrates the sacrificial material layer 128 disposed upon the substrate 122. The sacrificial material layer 128 can be deposited on the substrate 122 by methods such as, for example, spin-coating, doctor-blading, and plasma deposition.

Figure 16C:
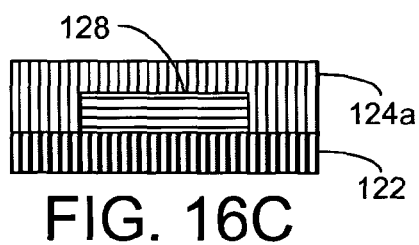

FIG. 16C illustrates the addition of a polymer bridge 124 over the sacrificial material layer 128. The polymer bridge 124a can be deposited on the substrate 122 by methods such as, for example, spin-coating, doctor-blading, and plasma deposition.

Figure 16D:
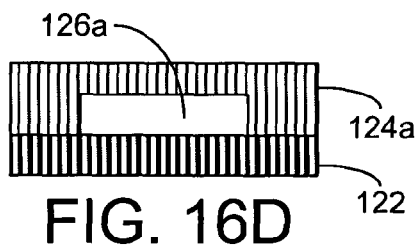

FIG. 16D illustrates the removal of the sacrificial material layer 128, which forms the unbound air-gap region 126a, so that the polymer bridge is positioned above the substrate 122.

L-Shaped Pillars

In general, L-shaped pillars can be used as interconnects. For example, the lateral portion of the L-shaped pillar extending from a chip can be directly embedded in a printed wiring board and couple to a waveguide or source embedded in the board.

Figure 17A:
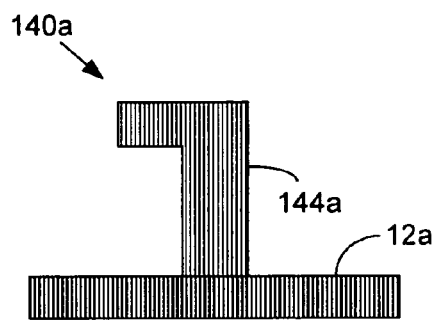
FIGS. 17A and 17B illustrate cross-sectional views of representative embodiments of L-shaped pillars.
Figure 17B:
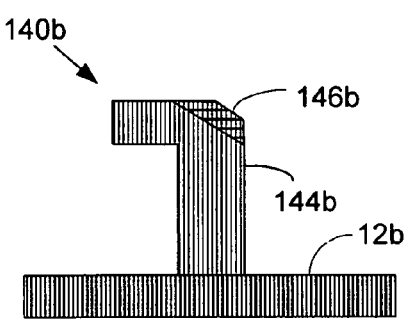
Figure 18A:
FIGS. 18A and 18B illustrate representative top views of L-shaped pillars shown in FIGS. 17A and 17B.
Figure 18B:

FIG. 17A illustrates a cross-sectional view of an L-shaped pillar 144a. The L-shaped structure 140a includes, but is not limited to, a first substrate 12a and L-shaped pillar 144a. FIG. 17B illustrates a cross-sectional view of an alternate embodiment of an L-shaped pillar 144b with a mirror 146b fabricated at the corner of the L-shaped pillar 144b. The first substrates 12a and 12b can include additional components, as described above. The L-shaped pillars 144a and 144b can be fabricated from materials, including but not limited to, photosensitive polymers. The photosensitive polymers can include, but are not limited to, the materials discussed in reference to FIGS. 1A, 1B, 2A through 2I, 3A and 3B for the pillars and sockets. The mirror 146b can be made of materials such as, but not limited to, metals used for simple total internal reflection. FIGS. 18A and 18B illustrate representative top views of L-shaped pillars. Alternate embodiments (not shown) could resemble helix-like polymer interconnections or pillars terminated with a circular disk rather than a lateral polymer channel.

For the purposes of illustration only, and without limitation, embodiments of the present invention will be described with particular reference to the below-described fabrication methods. Note that not every step in the process is described with reference to the process described in the figures hereinafter. Therefore, the following fabrication processes are not intended to be an exhaustive list that includes every step required to fabricate the embodiments of the L-shaped pillar 144a.

Figure 19C:
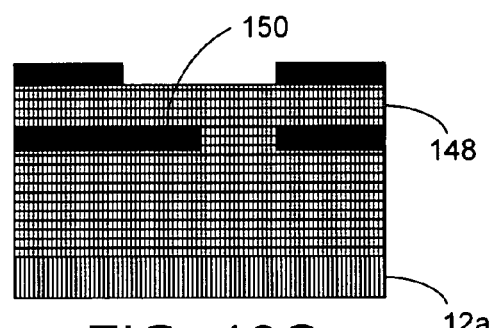
FIGS. 19A through 19E are cross-sectional views that illustrate a representative process for fabricating the L-shaped pillar illustrated in FIG. 17A.
Figure 19A:
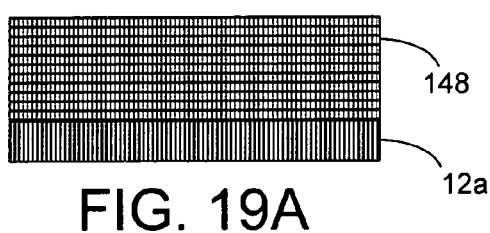

FIGS. 19A through 19E are cross-sectional views that illustrate a representative process for fabricating the L-shaped pillar 144a illustrated in FIG. 17A. FIG. 19A illustrates photosensitive polymer material 148 disposed upon the substrate 12a. The photosensitive polymer material 148 can be deposited on the substrate 12a by methods such as, for example, spin coating, doctor-blading, and plasma deposition.

Figure 19D:
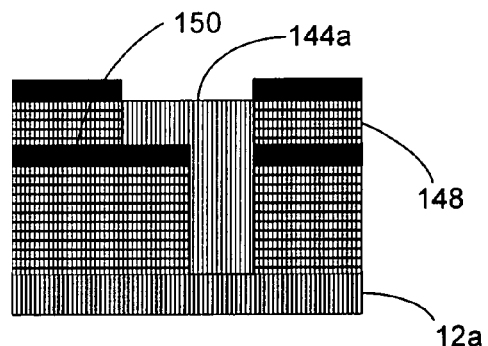
Figure 19B:
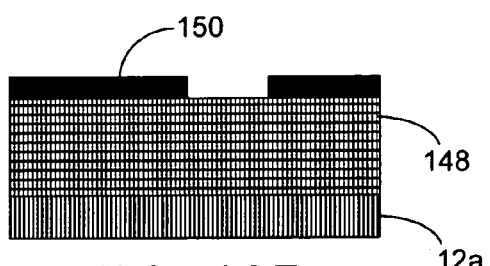

FIG. 19B illustrates the addition of a hard mask 150 to the photosensitive material 148. The hard mask is very reflective to the wavelength that the polymer is sensitive to and also adheres well to the polymer.

FIG. 19C illustrates the addition of another layer of photosensitive polymer material 148 and another hard mask 150. FIG. 19D illustrates the exposure of the photosensitive polymer material 148 at the portions defining the L-shaped pillar 144a.

Figure 19E:
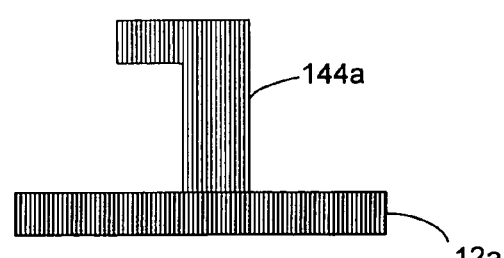

FIG. 19E illustrates the removal of the photosensitive material 148 and the hard mask 150. This can be performed by first developing the top polymer layer 148, then removing the hard mask 150, and then finally developing the bottom most polymer film 148. Removal of the photosensitive material can be facilitated by wet etch. Mask 150 is reflective to the wavelength used to photoimage the polymer, so that the polymer under the lowest most layer of the mask 150 is not exposed.

It should be emphasized that the above-described embodiments of the present invention are merely possible examples of implementations, and are merely set forth for a clear understanding of the principles of the invention. For example, the compliant pillars can be fabricated of multiple materials. The compliant pillars can also be used without the compliant sockets being on the board. In addition, the compliant sockets can be interconnected to other non-pillar like structures. Therefore, many variations and modifications may be made to the above-described embodiment(s) of the invention without departing substantially from the spirit and principles disclosed herein. All such modifications and variations are intended to be included herein within the scope of this disclosure and protected by the following claims.

Therefore, having thus described the invention, at least the following is claimed:

1. An input/output (I/O) interconnect system, comprising:
   a first substrate having at least one compliant pillar transversely extending from the first substrate, wherein the compliant pillar comprises a first material, and wherein the compliant pillar includes a non-flat tip at an end opposite the first substrate; and
   a second substrate having at least one compliant socket, wherein at least one of the compliant sockets is adapted to receive one of the compliant pillars of the first substrate within an opening in the compliant socket, wherein the compliant socket comprises a second material, wherein the compliant socket includes a non-flat top surface at an end opposite the second substrate that includes the opening of the compliant socket.

2. The I/O interconnect system of claim 1, wherein the first material comprises a low modulus material selected from polyimides, epoxides, polynorbornenes, polyarylene ethers, and parylenes.

3. The I/O interconnect system of claim 1, wherein the compliant pillar has a height of about 15 to 300 micrometers.

4. The I/O interconnect system of claim 1, wherein the compliant pillar has a length of about 2 to 55 micrometers and a width of about 2 to 55 micrometers.

5. The I/O interconnect system of claim 1, wherein the first substrate has from about 10 compliant pillars to about 500,000 compliant pillars per centimeter squared of the first substrate.

6. The I/O interconnect system of claim 1, wherein the second material comprises a low modulus material selected from polyimides, epoxides, polynorbornenes, polyarylene ethers, and parylenes.

7. The I/O interconnect system of claim 1, wherein the compliant socket has a height of about 5 to 30 micrometers.

8. The I/O interconnect system of claim 1, wherein the compliant socket includes a material that secures the compliant pillar to the compliant socket.

9. The I/O interconnect system of claim 1, wherein the compliant pillar is used as a transverse waveguide that is substantially perpendicular to the first substrate.

10. The I/O interconnect system of claim 9, further comprising an element selected from a diffractive grating coupler disposed on the compliant pillar and a mirror disposed on the compliant pillar.

11. The I/O interconnect system of claim 10, wherein the diffractive grating coupler is selected from a volume grating coupling element and a surface relief grating coupling element.

12. The I/O interconnect system of claim 1, further comprising an element selected from a diffractive grating coupler disposed within the second substrate and a mirror disposed within the second substrate.

13. The I/O interconnect system of claim 6, wherein the second substrate has from about 10 compliant sockets to about 100,000 compliant sockets per centimeter squared of the second substrate.

14. The I/O interconnect system of claim 1, further comprising a lead disposed upon a portion of the compliant pillar.

15. The I/O interconnect system of claim 14, wherein the lead is a radio frequency lead.

16. The I/O interconnect system of claim 14, wherein the lead is an electrical lead.

17. The I/O interconnect system of claim 15, wherein the first substrate has from about 10 compliant pillars to about 500,00 compliant pillars per centimeter squared of the first substrate.

18. The I/O interconnect system of claim 16, wherein the first substrate has from about 10 compliant pillars to about 100,000 compliant pillars per centimeter squared of the first substrate.

19. A dual-mode optical/electrical input/output (I/O) interconnect system, comprising:
   a first substrate having at least one optical/electrical I/O interconnect that includes a pillar transversely extending from the first substrate, wherein the pillar comprises a first material, the first material is optically conductive, and the pillar includes a lead disposed over a portion of the pillar extending from a base of the pillar on the first substrate to an end opposite the first substrate; and
   a second substrate having at least one socket adapted to receive the pillar and the lead, wherein the socket comprises a second material, wherein the second substrate includes a lead contact that communicatively connects the first substrate and the second substrate through the lead, wherein the second substrate includes an optical contact that communicatively connects the first substrate and the second substrate through the pillar.

20. The I/O interconnect system of claim 19, wherein the pillar is a compliant pillar.

21. The I/O interconnect system of claim 19, wherein the second material comprises a low modulus material selected from polyimides, epoxides, polynorbornenes, polyarylene ethers, and parylenes.

22. The I/O interconnect system of claim 19, wherein the socket is a compliant socket.

23. The I/O interconnect system of claim 19, wherein the pillar includes a non-flat tip at an end opposite the first substrate.

24. The I/O interconnect system of claim 19, wherein the first material comprises a low modulus material selected from polyimides, epoxides, polynorbornenes, polyarylene ethers, and parylenes.

25. The I/O interconnect system of claim 19, wherein the first substrate has from about 10 to about 100,000 optical/electrical I/O interconnects per centimeter squared of the first substrate.

26. The I/O interconnect system of claim 19, further comprising an element disposed on an end of the pillar opposite the first substrate, the element selected from a diffractive grating coupler and a mirror.

27. The I/O interconnect system of claim 26, wherein the diffractive grating coupler is selected from a volume grating coupling element and a surface relief grating coupling element.

28. A method for forming a device comprising:
   providing a first substrate having at least one optical/electrical I/O interconnect that includes a pillar transversely extending from the first substrate, wherein the pillar comprises a first material, the first material is optically conductive, and the pillar includes a lead disposed over a portion of the pillar extending from a base of the pillar on the first substrate to an end opposite the first substrate;

providing a second substrate having at least one socket adapted to receive the optical/electrical I/O interconnect, wherein the socket comprises a second material, wherein the second substrate includes a lead contact that communicatively connects the first substrate and the second substrate through the lead, wherein the second substrate includes an optical contact that communicatively connects the first substrate and the second substrate through the pillar; and causing the socket to receive a portion of the optical/electrical I/O interconnect.

29. A method of aligning substrates, comprising:

providing a first substrate having at least one optical/electrical I/O interconnect that includes a pillar transversely extending from the first substrate, wherein the pillar comprises a first material, the first material is optically conductive, and the pillar includes a lead disposed over a portion of the pillar extending from a base of the pillar on the first substrate to an end opposite the first substrate;

providing a second substrate having at least one socket adapted to receive the optical/electrical I/O interconnect, wherein the socket comprises a second material, wherein the second substrate includes a lead contact that communicatively connects the first substrate and the second substrate through the lead, wherein the second substrate includes an optical contact that communicatively connects the first substrate and the second substrate through the pillar;

maintaining optical alignment between the first substrate and the second substrate using the optical/electrical I/O interconnect and the socket; and maintaining electrical interconnection between the first substrate and the second substrate using the optical/electrical I/O interconnect and the socket.

30. A method of directing optical energy and electrical energy, comprising:

providing a first substrate having at least one optical/electrical I/O interconnect that includes a pillar transversely extending from the first substrate, wherein the pillar comprises a first material, the first material is optically conductive, and the pillar includes a lead disposed over a portion of the pillar extending from a base of the pillar on the first substrate to an end opposite the first substrate;

providing a second substrate having a socket adapted to receive the optical/electrical I/O interconnect, wherein the socket comprises a second material, wherein the second substrate includes a lead contact that communicatively connects the first substrate and the second substrate through the lead, wherein the second substrate includes at least one optical contact that communicatively connects the first substrate and the second substrate through the pillar;

communicating optical energy between the pillar of the first substrate and the optical contact of the second substrate; and communicating electrical energy between the lead of the first substrate and the lead contact of the second substrate.

31. An input/output (I/O) interconnect system, comprising:

a first substrate having at least one compliant pillar transversely extending from the first substrate, wherein the compliant pillar comprises a first material, and wherein the compliant pillar includes a non-flat tip at an end opposite the first substrate, wherein the compliant pillar is used as a transverse waveguide that is substantially perpendicular to the first substrate, wherein the compliant pillar has a height of about 15 to 300 micrometers; and an element selected from a diffractive grating coupler disposed on the compliant pillar and a mirror disposed on the compliant pillar.

32. The I/O interconnect system of claim 31, wherein the first material comprises a low modulus material selected from polyimides, epoxides, polynorbornenes, polyarylene ethers, and parylenes.

33. The I/O interconnect system of claim 31, wherein the compliant pillar has a length of about 2 to 55 micrometers and a width of about 2 to 55 micrometers.

34. The I/O interconnect system of claim 31, wherein the first substrate has from about 10 compliant pillars to about 500,000 compliant pillars per centimeter squared of the first substrate.

35. The I/O interconnect system of claim 31, further comprising:

a second substrate having at least one compliant socket adapted to receive a compliant pillar, wherein the compliant socket comprises a second material, wherein the compliant socket includes a non-flat top surface at an end opposite the second substrate.

36. The I/O interconnect system of claim 35, wherein the second material comprises a low modulus material selected from polyimides, epoxides, polynorbornenes, polyarylene ethers, and parylenes.

37. The I/O interconnect system of claim 35, wherein the compliant socket has a height of about 5 to 30 micrometers.

38. The I/O interconnect system of claim 35, wherein the compliant socket includes a material that secures the compliant pillar to the compliant socket.

39. The I/O interconnect system of claim 31, wherein the diffractive grating coupler is selected from a volume grating coupling element and a surface relief grating coupling element.

40. The I/O interconnect system of claim 35, further comprising an element selected from a diffractive grating coupler disposed within the second substrate and a mirror disposed within the second substrate.

41. The I/O interconnect system of claim 36, wherein the second substrate has from about 10 compliant sockets to about 100,000 compliant sockets per centimeter squared of the second substrate.

42. The I/O interconnect system of claim 31, further comprising a lead disposed upon a portion of the compliant pillar.

43. The I/O interconnect system of claim 42, wherein the lead is a radio frequency lead.

44. The I/O interconnect system of claim 42, wherein the lead is an electrical lead.

45. The I/O interconnect system of claim 43, wherein the first substrate has from about 10 compliant pillars to about 500,000 compliant pillars per centimeter squared of the first substrate.

46. The I/O interconnect system of claim 44, wherein the first substrate has from about 10 compliant pillars to about 100,000 compliant pillars per centimeter squared of the first substrate.

47. An input/output (I/O) interconnect system, comprising:
 a first substrate having at least one compliant pillar transversely extending from the first substrate, wherein the compliant pillar comprises a first material, and wherein the compliant pillar includes a non-flat tip at an end opposite the first substrate, wherein the compliant pillar has a height of about 15 to 300 micrometers; and
 a lead disposed upon a portion of the compliant pillar, wherein the lead is a radio frequency lead.

48. The I/O interconnect system of claim 47, wherein the first material comprises a low modulus material selected from polyimides, epoxides, polynorbornenes, polyarylene ethers, and parylenes.

49. The I/O interconnect system of claim 47, wherein the compliant pillar has a length of about 2 to 55 micrometers and a width of about 2 to 55 micrometers.

50. The I/O interconnect system of claim 47, wherein the first substrate has from about 10 compliant pillars to about 500,000 compliant pillars per centimeter squared of the first substrate.

51. The I/O interconnect system of claim 47, further comprising:
 a second substrate having at least one compliant socket adapted to receive a compliant pillar and the lead, wherein the compliant socket comprises a second material, wherein the compliant socket includes a non-flat top surface at an end opposite the second substrate.

52. The I/O interconnect system of claim 51, wherein the second material comprises a low modulus material selected from polyimides, epoxides, polynorbornenes, polyarylene ethers, and parylenes.

53. The I/O interconnect system of claim 51, wherein the compliant socket has a height of about 5 to 30 micrometers.

54. The I/O interconnect system of claim 51, wherein the compliant socket includes a material that secures the compliant pillar to the compliant socket.

55. The I/O interconnect system of claim 47, wherein the compliant pillar is a transverse waveguide that is substantially perpendicular to the first substrate.

56. The I/O interconnect system of claim 55, further comprising an element selected from a diffractive grating coupler disposed on the compliant pillar and a mirror disposed on the compliant pillar.

57. The I/O interconnect system of claim 56, wherein the diffractive grating coupler is selected from a volume grating coupling element and a surface relief grating coupling element.

58. The I/O interconnect system of claim 51, further comprising an element selected from a diffractive grating coupler disposed within the second substrate and a mirror disposed within the second substrate.

59. The I/O interconnect system of claim 51, wherein the second substrate has from about 10 compliant sockets to about 100,000 compliant sockets per centimeter squared of the second substrate.

60. The I/O interconnect system of claim 51, wherein the first substrate has from about 10 compliant pillars to about 500,000 compliant pillars per centimeter squared of the first substrate.

61. An input/output (I/O) interconnect system, comprising:
 a first substrate having at least one compliant pillar transversely extending from the first substrate, wherein the compliant pillar comprises a first material, and wherein the compliant pillar includes a non-flat tip at an end opposite the first substrate, wherein the compliant pillar is used as a transverse waveguide that is substantially perpendicular to the first substrate, wherein the first substrate has from about 10 compliant pillars to about 500,000 compliant pillars per centimeter squared of the first substrate; and
 an element selected from a diffractive grating coupler disposed on the compliant pillar and a mirror disposed on the compliant pillar.

62. The I/O interconnect system of claim 61, wherein the first material comprises a low modulus material selected from polyimides, epoxides, polynorbornenes, polyarylene ethers, and parylenes.

63. The I/O interconnect system of claim 61, wherein the compliant pillar has a height of about 15 to 300 micrometers.

64. The I/O interconnect system of claim 61, wherein the compliant pillar has a length of about 2 to 55 micrometers and a width of about 2 to 55 micrometers.

65. The I/O interconnect system of claim 61, further comprising:
 a second substrate having at least one compliant socket adapted to receive a compliant pillar, wherein the compliant socket comprises a second material, wherein the compliant socket includes a non-flat top surface at an end opposite the second substrate.

66. The I/O interconnect system of claim 65, wherein the second material comprises a low modulus material selected from polyimides, epoxides, polynorbornenes, polyarylene ethers, and parylenes.

67. The I/O interconnect system of claim 65, wherein the compliant socket has a height of about 5 to 30 micrometers.

68. The I/O interconnect system of claim 65, wherein the compliant socket includes a material that secures the compliant pillar to the compliant socket.

69. The I/O interconnect system of claim 61, wherein the diffractive grating coupler is selected from a volume grating coupling element and a surface relief grating coupling element.

70. The I/O interconnect system of claim 65, further comprising an element selected from a diffractive grating coupler disposed within the second substrate and a mirror disposed within the second substrate.

71. The I/O interconnect system of claim 65, wherein the second substrate has from about 10 compliant sockets to about 100,000 compliant sockets per centimeter squared of the second substrate.

72. The I/O interconnect system of claim 61, further comprising a lead disposed upon a portion of the compliant pillar.

73. The I/O interconnect system of claim 72, wherein the lead is a radio frequency lead.

74. The I/O interconnect system of claim 72, wherein the lead is an electrical lead.

75. The I/O interconnect system of claim 74, wherein the first substrate has from about 10 compliant pillars to about 100,000 compliant pillars per centimeter squared of the first substrate.

76. An input/output (I/O) interconnect system, comprising:
 a first substrate having at least one compliant pillar transversely extending from the first substrate, wherein the compliant pillar comprises a first material, and wherein the compliant pillar includes a non-flat tip at an end opposite the first substrate, wherein a lead is disposed upon a portion of the compliant pillar, and wherein the lead is a radio frequency lead; and
 a second substrate having at least one compliant socket adapted to receive a compliant pillar and the lead, wherein the compliant socket comprises a second material, wherein the compliant socket includes a non-flat top surface at an end opposite the second substrate.

77. The I/O interconnect system of claim 76, wherein the first material comprises a low modulus material selected from polyimides, epoxides, polynorbornenes, polyarylene ethers, and parylenes.

78. The I/O interconnect system of claim 76, wherein the compliant pillar has a height of about 15 to 300 micrometers.

79. The I/O interconnect system of claim 76, wherein the compliant pillar has a length of about 2 to 55 micrometers and a width of about 2 to 55 micrometers.

80. The I/O interconnect system of claim 76, wherein the first substrate has from about 10 compliant pillars to about 500,000 compliant pillars per centimeter squared of the first substrate.

81. The I/O interconnect system of claim 76, wherein the second material comprises a low modulus material selected from polyimides, epoxides, polynorbornenes, polyarylene ethers, and parylenes.

82. The I/O interconnect system of claim 76, wherein the compliant socket has a height of about 5 to 30 micrometers.

83. The I/O interconnect system of claim 76, wherein the compliant socket includes a material that secures the compliant pillar to the compliant socket.

84. The I/O interconnect system of claim 76, wherein the compliant pillar is a transverse waveguide that is substantially perpendicular to the first substrate.

85. The I/O interconnect system of claim 84, further comprising an element selected from a diffractive grating coupler disposed on the compliant pillar and a mirror disposed on the compliant pillar.

86. The I/O interconnect system of claim 85, wherein the diffractive grating coupler is selected from a volume grating coupling element and a surface relief grating coupling element.

87. The I/O interconnect system of claim 76, further comprising an element selected from a diffractive grating coupler disposed within the second substrate and a mirror disposed within the second substrate.

88. The I/O interconnect system of claim 76, wherein the second substrate has from about 10 compliant sockets to about 100,000 compliant sockets per centimeter squared of the second substrate.

* * * * *

UNITED STATES PATENT AND TRADEMARK OFFICE
CERTIFICATE OF CORRECTION

| | | |
|---|---|---|
| PATENT NO. | : 7,099,525 B2 | Page 1 of 1 |
| APPLICATION NO. | : 10/647703 | |
| DATED | : August 29, 2006 | |
| INVENTOR(S) | : Bakir et al. | |

It is certified that error appears in the above-identified patent and that said Letters Patent is hereby corrected as shown below:

INVENTORSHIP

Delete "Kevin P. Martin"

IN THE CLAIMS

Col. 6, line 43, delete "opticavelectrical" and replace with --optical/electrical--;

Col. 11, line 39, delete "mitigate" and replace with --mitigates--.

Signed and Sealed this

Twenty-third Day of January, 2007

JON W. DUDAS
*Director of the United States Patent and Trademark Office*